US009996831B2

(12) United States Patent
Dixon et al.

(10) Patent No.: US 9,996,831 B2
(45) Date of Patent: Jun. 12, 2018

(54) MOBILE WIRELESS PAYMENT AND ACCESS

(71) Applicant: Cubic Corporation, San Diego, CA (US)

(72) Inventors: Philip B. Dixon, San Diego, CA (US); Walter C. Bonneau, Jr., Escondido, CA (US); Kay Paetzold, Hamburg (DE); Raymond L. deKozan, La Mesa, CA (US); Timothy Cook, Carlsbad, CA (US); Pradip Mistry, San Diego, CA (US)

(73) Assignee: CUBIC CORPORATION, San Diego, CA (US)

( * ) Notice: Subject to any disclaimer, the term of this patent is extended or adjusted under 35 U.S.C. 154(b) by 229 days.

(21) Appl. No.: 14/825,080

(22) Filed: Aug. 12, 2015

(65) Prior Publication Data

US 2017/0046681 A1 Feb. 16, 2017

Related U.S. Application Data

(60) Continuation-in-part of application No. 13/524,248, filed on Jun. 15, 2012, now abandoned, which is a
(Continued)

(51) Int. Cl.
*G07B 15/00* (2011.01)
*G06Q 20/32* (2012.01)
(Continued)

(52) U.S. Cl.
CPC ....... *G06Q 20/322* (2013.01); *G06Q 20/0453* (2013.01); *G06Q 20/145* (2013.01);
(Continued)

(58) Field of Classification Search
CPC ..... G06Q 10/02; G06Q 50/30; G06Q 30/0284
(Continued)

(56) References Cited

U.S. PATENT DOCUMENTS 6,374,176 B1 * 4/2002 Schmier ................ G08G 1/123
340/988
6,888,443 B2 * 5/2005 Ritter ..................... G07B 15/02
340/5.64
(Continued)

FOREIGN PATENT DOCUMENTS

EP 1667075 A1 6/2006
WO 00/31691 A1 6/2000
(Continued)

OTHER PUBLICATIONS

"Be-In-Be-Out Payment Systems for Public Transport," published in Jul. 2009 by GWT-TUD GmbH, pp. 90-110 (Year: 2009).*
(Continued)

*Primary Examiner* — Brian M Epstein
(74) *Attorney, Agent, or Firm* — Kilpatrick Townsend and Stockton LLP

(57) ABSTRACT

Embodiments of systems, methods, and devices are disclosed for enabling wireless mobile devices to be automatically detected and used as fare media on vehicles in a transit and/or transportation system. Embodiments include detecting a wireless mobile device and utilizing a unique identifier of the wireless mobile device to track a transit user's entry to and exit from a transit vehicle. Embodiments further include causing the wireless mobile device to display a fare payment indicator, allowing the transit user to use the wireless mobile device to show proof of payment if so solicited by a fare inspector. A corresponding fare can be calculated and paid for in a variety of ways.

18 Claims, 22 Drawing Sheets

Related U.S. Application Data division of application No. 12/952,706, filed on Nov. 23, 2010, now abandoned.

(60) Provisional application No. 61/354,148, filed on Jun. 11, 2010, provisional application No. 61/264,618, filed on Nov. 25, 2009.

(51) Int. Cl.
*G06Q 20/04* (2012.01)
*G07B 15/02* (2011.01)
*G06Q 20/14* (2012.01)
*G06Q 50/30* (2012.01)

(52) U.S. Cl.
CPC ....... *G06Q 20/325* (2013.01); *G06Q 20/3278* (2013.01); *G06Q 50/30* (2013.01); *G07B 15/02* (2013.01)

(58) Field of Classification Search
USPC .......................................................... 705/13
See application file for complete search history.

(56) References Cited

U.S. PATENT DOCUMENTS

| | | | |
|---|---|---|---|
| 7,200,382 B2 | 4/2007 | Arai | |
| 2004/0015475 A1* | 1/2004 | Scheepsma | G07B 15/02 |
| 2004/0115475 A1* | 6/2004 | Hashimoto | C07C 13/547 |
| | | | 428/690 |
| 2004/0119609 A1 | 6/2004 | Solomon | |
| 2005/0056696 A1 | 3/2005 | Green et al. | |
| 2007/0299722 A1* | 12/2007 | Stoffelsma | G06Q 10/02 |
| | | | 705/13 |
| 2008/0195428 A1* | 8/2008 | O'Sullivan | G06Q 10/00 |
| | | | 705/6 |
| 2008/0198228 A1* | 8/2008 | Rizk | B60R 1/008 |
| | | | 348/148 |
| 2008/0215380 A1* | 9/2008 | Graeber | G06Q 10/02 |
| | | | 705/5 |
| 2008/0277183 A1* | 11/2008 | Huang | B60R 25/00 |
| | | | 180/271 |
| 2010/0017275 A1 | 1/2010 | Carlson et al. | |
| 2010/0076878 A1 | 3/2010 | Burr et al. | |
| 2010/0078475 A1* | 4/2010 | Lin | B64F 1/366 |
| | | | 235/380 |
| 2010/0082491 A1 | 4/2010 | Rosenblatt et al. | |
| 2010/0144375 A1* | 6/2010 | Pfister | G07B 15/02 |
| | | | 455/456.5 |
| 2010/0161392 A1* | 6/2010 | Ashby | G06Q 30/02 |
| | | | 705/13 |
| 2010/0197325 A1* | 8/2010 | Dredge | H04L 67/18 |
| | | | 455/456.3 |
| 2010/0197352 A1* | 8/2010 | Runstedler | G06F 3/0233 |
| | | | 455/566 |
| 2011/0047037 A1* | 2/2011 | Wu | G06Q 20/204 |
| | | | 705/17 |
| 2011/0060600 A1* | 3/2011 | Fox | G01S 19/51 |
| | | | 705/1.1 |
| 2011/0099040 A1* | 4/2011 | Felt | G06F 17/3087 |
| | | | 705/7.12 |
| 2011/0130916 A1* | 6/2011 | Mayer | G07C 5/008 |
| | | | 701/31.4 |
| 2011/0137773 A1 | 6/2011 | Davis et al. | |
| 2011/0153495 A1* | 6/2011 | Dixon | G06Q 20/10 |
| | | | 705/39 |
| 2011/0202393 A1* | 8/2011 | DeWakar | G06Q 20/102 |
| | | | 705/13 |
| 2011/0301985 A1* | 12/2011 | Camp | G06Q 10/02 |
| | | | 705/5 |
| 2011/0313821 A1* | 12/2011 | Hilton | G07B 15/00 |
| | | | 705/13 |
| 2012/0101942 A1* | 4/2012 | Park | G06O 20/0457 |
| | | | 705/40 |
| 2012/0158467 A1* | 6/2012 | Hammad | G06Q 20/045 |
| | | | 705/13 |
| 2012/0254040 A1 | 10/2012 | Dixon et al. | |
| 2013/0030964 A1 | 1/2013 | Nuzzi et al. | |
| 2013/0054281 A1* | 2/2013 | Thakkar | G06O 30/0207 |
| | | | 705/5 |
| 2013/0185123 A1* | 7/2013 | Krivopaltsev | G06Q 50/30 |
| | | | 705/13 |
| 2015/0178698 A1* | 6/2015 | Schulz | G06Q 20/145 |
| | | | 705/13 |
| 2015/0235477 A1* | 8/2015 | Simkin | G07B 15/02 |
| | | | 705/417 |
| 2015/0242764 A1* | 8/2015 | Subbaraj | G06Q 10/02 |
| | | | 705/5 |

FOREIGN PATENT DOCUMENTS

| | | |
|---|---|---|
| WO | 01/69540 A1 | 9/2001 |
| WO | 2005/031656 A1 | 4/2005 |
| WO | 2011/066327 A1 | 6/2011 |

OTHER PUBLICATIONS

Scourias, John, "Overview of the Global System for Mobile Communications", last modified Mar. 27, 1996, 16 pages.

GWT-TUD GmbH Department for Transport, "Be-In-Be-Out Payment Systems for Public Transport", Final Report, Jul. 2009, 160 pages.

International Telecommunication Union "Social and Human Considerations for a More Mobile World" ITU/MIC Workshop on Shaping the Future Mobile Information Society Mar. 2004, 44 pages.

PCT International Search Report and Written Opinion of PCT/US2010/057899 dated Feb. 22, 2011, 12 pages.

MD. Foisal Mahedi Hasan et al. "RFID-based Ticketing for Public Transport System: Perspective Megacity Dhaka" 2010, 6 pages.

"Cubic Launches New Bus Platform to Integrate Automatic Fare Collection Systems"; Business Editors. Business Wire [New York] Sep. 25, 2002, all pages.

U.S. Appl. No. 13/524,248, filed Jun. 15, 2012, Non Final Office Action dated Sep. 26, 2012, all pages.

U.S. Appl. No. 13/524,248, filed Jun. 15, 2012, Final Office Action dated Jan. 17, 2013, all pages.

U.S. Appl. No. 13/524,248, filed Jun. 15, 2012, Non Final Office Action dated Feb. 5, 2014, all pages.

U.S. Appl. No. 13/524,248, filed Jun. 15, 2012, Final Office Action dated May 30, 2014, all pages.

U.S. Appl. No. 13/524,248, filed Jun. 15, 2012, Non-Final Office Action dated Sep. 23, 2014, all pages.

U.S. Appl. No. 12/952,706, filed Nov. 23, 2010, Non Final Office Action dated Jun. 20, 2012, all pages.

U.S. Appl. No. 12/952,706, filed Nov. 23, 2010, Final Office Action dated Nov. 9, 2012, all pages.

U.S. Appl. No. 12/952,706, filed Nov. 23, 2010, Non Final Office Action dated Feb. 15, 2013, all pages.

U.S. Appl. No. 12/952,706, filed Nov. 23, 2010, Final Office Action dated Jul. 18, 2013, all pages.

U.S. Appl. No. 12/952,706, filed Nov. 23, 2010, Non Final Office Action dated Jan. 28, 2014, all pages.

U.S. Office Action dated Sep. 29, 2014 for U.S. Appl. No. 12/952,706, filed Nov. 23, 2010, all pages.

U.S. Appl. No. 12/952,706, filed Nov. 23, 2010, Final Office Action dated Jan. 29, 2015, all pages.

U.S. Appl. No. 13/524,248, filed Jun. 15, 2012, Final Office Action dated Feb. 12, 2015, all pages.

International Search Report and Written Opinion dated Oct. 11, 2016 for International Patent Application No. PCT/US2016/045755 filed Aug. 5, 2016; all pages.

* cited by examiner

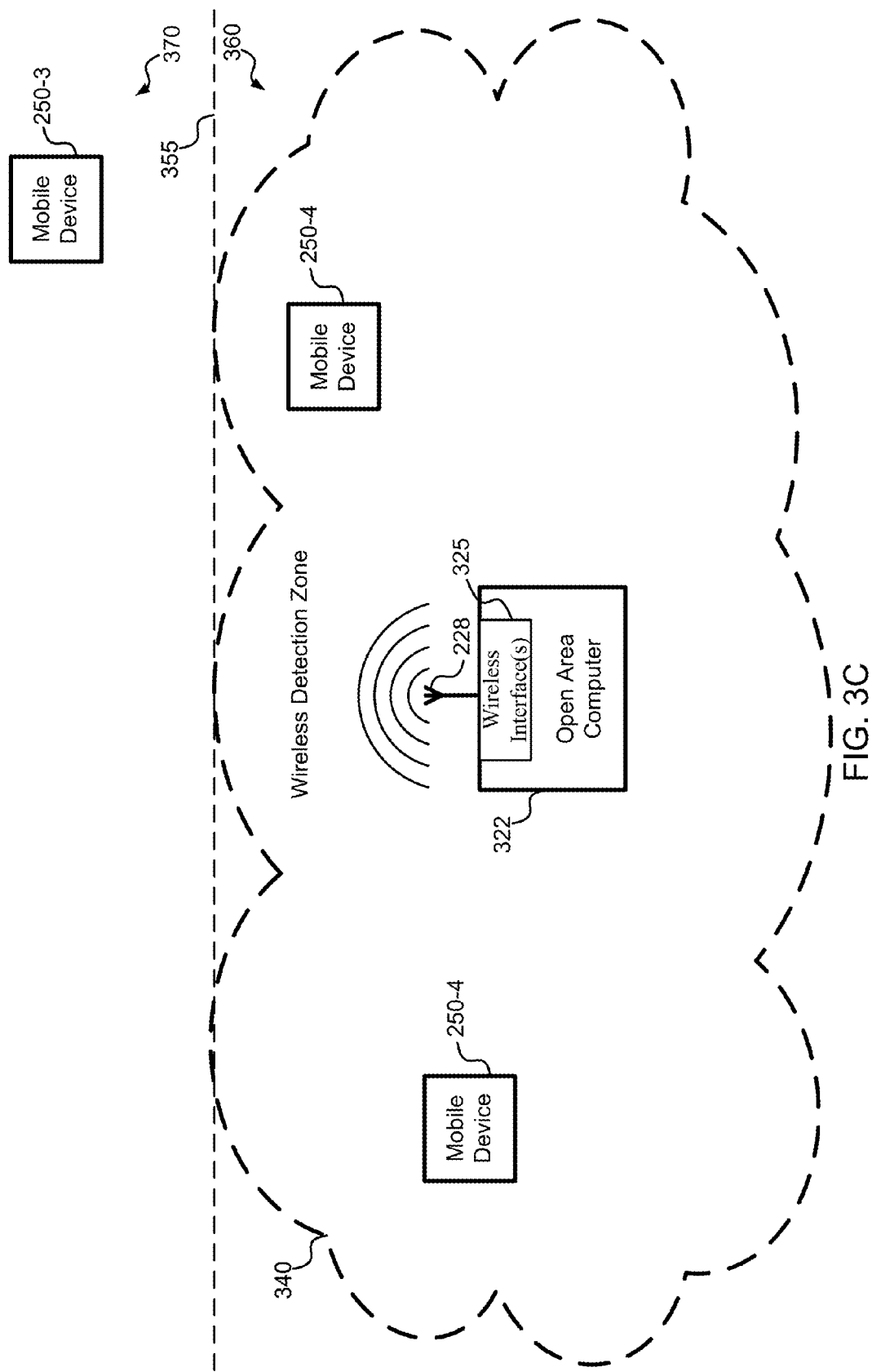

MOBILE WIRELESS PAYMENT AND ACCESS

BACKGROUND OF THE INVENTION

This invention relates to automatic payment using wireless mobile devices and, in particular, to said automatic payments in transit and/or transportation systems.

Transit systems typically limit access to transit vehicles based on two methods: barrier and proof of payment. The barrier method usually requires transit users to swipe, tap, or otherwise present fare media at an access control point, such as a turnstile, of the transit system to gain entry to and/or exit from an area or vehicle of the transit system. On the other hand, the proof of payment method generally permits transit users to gain entry to and/or exit from an area or vehicle of the transit system, but requires transit users to provide proof of payment if solicited to do so by a fare inspector.

Both barrier and proof of payment methods typically use impersonalized fare media issued by the transit service provider. Fare media often includes, for example, tickets (which may need to be validated), stored value smart cards, magnetic stripe cards, etc. Because this fare media is typically issued by the transit service provider, it requires transit users to purchase new fare media or reload used fare media from the transit service provider to access the transit system. Moreover, the tickets and/or cards typically used as fare media are often lost or stolen, leading to loss of value to the transit user, the transit service provider, or both.

BRIEF SUMMARY OF THE INVENTION

Embodiments of systems, methods, and devices are disclosed for enabling wireless mobile devices to be automatically detected and used as fare media on vehicles in a transit and/or transportation system. Embodiments include detecting a wireless mobile device and utilizing a unique identifier of the wireless mobile device to track a transit user's entry to and exit from a transit vehicle. Embodiments further include causing the wireless mobile device to display a fare payment indicator, allowing the transit user to use the wireless mobile device to show proof of payment if so solicited by a fare inspector. A corresponding fare can be calculated and paid for in a variety of ways.

According to one embodiment, a method is provided for enabling automatic fare payment in a transit system. The method comprises providing a transit vehicle computer on a transit vehicle, where the transit vehicle computer has a wireless interface. The method further includes using the wireless interface to receive a unique identifier associated with a mobile device and determine that the mobile device has entered the transit vehicle. The wireless interface further can be used to send information regarding a fare payment indicator to the mobile device. This information can cause the mobile device to show the fare payment indicator on the mobile device's display it is determined the mobile device has exited the transit vehicle. The method can further comprise using the wireless interface to determine the mobile device has exited the transit vehicle and calculating a fare associated with the unique identifier.

Numerous variations of this embodiment are contemplated. For example, determining that the mobile device has entered and/or exited the vehicle can include receiving a first communication from the mobile device when the transit vehicle is at a first location, and receiving a second communication from the mobile device when the transit vehicle is at a second location. Additionally or alternatively, the method can include sending information associated with the fare to a mobile device, a wireless carrier network, a central server of the transit system, or any combination thereof. Moreover, where the fare payment indicator is a first fare payment indicator, the wireless interface can be used to send additional information to the mobile device that causes the mobile device to show a second fare payment indicator on the device's display.

This embodiment may also provide interaction with a fare inspector device. For instance, the method can include using the wireless interface to send inspection information to a fare inspector device. This inspection information can cause the fare inspector device the fare payment indicator on the fare inspector device's display. Additionally or alternatively, the method can include determining that a second mobile device is already in the transit vehicle and sending information to a fare inspector device to indicate possible fraud associated with the second mobile device. Moreover, the information sent to the fare inspector device can include a unique identifier associated with the second mobile device.

Yet other variations of this embodiment are contemplated. For instance the method can include accessing identifier information from a database and determining whether the unique identifier is included in the identifier information. Additionally or alternatively information associated with the unique identifier can be accessed from a database. This can further include determining whether to send the fare payment indicator information to the mobile device, based, at least in part, on the information associated with the unique identifier. The method can also include using the information associated with the unique identifier to determine that an account associated with the unique identifier has inadequate funds to pay for the fare and sending information to the mobile device causing the mobile device to display an indication that the account has inadequate funds to pay for the fare. Additionally or alternatively, payment information can be received from the mobile device.

Yet other variations are contemplated. For example, determining that the mobile device has entered and/or exited the vehicle can include using location information associated with the mobile device, transit vehicle, or both; movement information associated with the mobile device, transit vehicle, or both; information regarding the route of the transit vehicle; information received from one or more additional wireless devices in the transit vehicle; and/or input received by the mobile device from a transit user. Furthermore, the wireless interface can be used to send information associated with a current location of the transit vehicle. Finally, the fare calculation can be based, at least in part, on the determination(s) that the mobile device has entered and/or exited the transit vehicle, an associated location, and/or a time of day.

According to an alternate embodiment, a system is provided for enabling automatic fare payment in transit. The system can comprise a wireless interface configured to communicate with a mobile device on a transit vehicle, a processor communicatively coupled with the wireless interface and a memory, and the memory. The memory can have instructions embodied therein which, when executed by the processor, cause the system to use the wireless interface to receive a unique identifier associated with the mobile device and determine that the mobile device has entered the transit vehicle. The wireless interface can be further used to send fare payment indicator information to the mobile device, which causes the mobile device to show a fare payment indicator on the mobile device's display. The fare payment indicator can be displayed by the mobile device before the processor determines the mobile device has exited the transit vehicle. The instructions can further cause the system to determine that the mobile device has exited the transit vehicle and calculate a fare associated with the unique identifier.

As described herein, numerous variations to this embodiment are contemplated. For example, determining that the mobile device has entered and/or exited can include receiving a first communication from the mobile device when the transit vehicle is at a first location and receiving a second communication from the mobile device when the transit vehicle is at a second location. Moreover, the system further can comprise a location module communicatively coupled with the processor that provides location information of the transit vehicle. In fact, the instructions, when executed by the processor, further can cause the system to send information associated with a current location of the transit vehicle. Additionally or alternatively, at least one motion sensor can be communicatively coupled with the processor provide to motion information of the transit vehicle.

Yet other alterations to the system are contemplated. One such alteration includes having instructions, when executed by the processor, further causing the system use the wireless interface to send additional information to the mobile device. This additional information can cause the mobile device to show a second fare payment indicator on the mobile device's display. Additionally or alternatively, the wireless interface may be used to send information to a fare inspector device. This information can cause the fare inspector device to show the fare payment indicator on its display. In fact, the information sent to the fare inspector device can also cause the fare inspector device to show the unique identifier of the mobile device on the fare inspector device's display. Moreover, the instructions, when executed by the processor, can further cause the system to access identifier information from a database and determine whether the unique identifier is included in the identifier information. The memory can also information regarding fare rates, and calculating the fare can include retrieving the information regarding fare rates from the memory.

The system also can include a wide area network (WAN). The instructions, for instance, further can cause the system to use the WAN interface to send information associated with the fare to a wireless carrier network associated with the mobile device. Additionally or alternatively, calculating the fare can comprise using the WAN interface to retrieve information from a database not located in the transit vehicle. This can include information associated with the unique identifier. Moreover, the system can use the information associated with the unique identifier to determine that an account associated with the unique identifier has inadequate funds to pay for the fare, sending information to the mobile device to cause the mobile device to display and indication that the account has inadequate funds to pay for the fare. With this in mind, the system can also receive payment information from the mobile device.

The system can include yet more features. Determining that the mobile device has entered and/or exited the vehicle can include, for example, using location information associated with the mobile device, transit vehicle, or both; movement information associated with the mobile device, transit vehicle, or both; information regarding the route of the transit vehicle; information received from one or more additional wireless devices in the transit vehicle; and/or input received by the mobile device from a transit user. Additionally or alternatively, the fare can be based on the determination that the mobile device has entered the transit vehicle, the determination that the mobile device has exited the transit vehicle, a location associated with the determining that the mobile device has entered the transit vehicle, a location associated with the determining that the mobile device has entered the transit vehicle, and/or a time of day.

An additional embodiment includes a mobile device for enabling automatic fare payment in transit. This mobile device can comprise a wireless interface allowing communication with a system on a transit vehicle, a display, a processor communicatively coupled with the wireless interface, the display, and a memory. The memory can have instructions embodied therein which, when executed by the processor, cause the mobile device to use the wireless interface to send a unique identifier associated with the mobile device. It can also use the wireless interface to receive an indication that the mobile device is on the transit vehicle and receive fare payment indicator information. The mobile device further can show a fare payment indicator on the display, where the fare payment indicator is based, at least in part, on the fare payment indicator information. The fare payment indicator can be shown on the display before the mobile device receives an indication that the mobile device has exited the transit vehicle. The mobile device can further receive, using the wireless interface, an indication that the mobile device has exited the transit vehicle.

As with the other embodiments described herein, various alterations and/or additions are contemplated. If, for example, where the fare payment indicator information comprise a first set of fare payment indicator information and the fare payment indicator comprises a first fare payment indicator, the mobile can use the wireless interface to receive a second set of fare payment indicator information and show a second fare payment indicator on the display. The second fare payment indicator can be based, at least in part, on the second set of fare payment indicator information, and shown on the display before the mobile device receives the indication that the mobile device has exited the transit vehicle.

The mobile device can include other features in addition, or as an alternative, to those discussed above. For instance, the mobile device can include a location module communicatively coupled with the processor that provides location information associated with the mobile device. The mobile device can therefore send the location information associated with the mobile device. Additionally or alternatively, the instructions, when executed by the processor, further can cause the mobile device to use the wireless interface to receive information associated with a current location of the transit vehicle and show information on the display based, at least in part, on the information associated with the current location of the transit vehicle. Moreover, the mobile device can include at least one motion sensor, communicatively coupled with the processor, that provides motion information associated with the mobile device. The mobile device can therefore send the motion information associated with the mobile device. Finally, the mobile device can include a user input interface, allowing the instructions, when executed by the processor, to further cause the mobile device to use the wireless interface to receive an indication that an account associated with the unique identifier has inadequate funds, receive payment information, and send the payment information.

In one aspect, a method for enabling automatic fare payment in a transit system is provided. The method may include providing a mobile transit vehicle computer on a moving transit vehicle. The mobile transit computer may include a wireless detection zone having a wireless interface.

The wireless detection zone may extend to at least a physical boundary of the transit vehicle. The method may also include receiving, using the wireless interface, an indication that a first user device has checked into the transit vehicle at a first location. The indication may include an identifier of the first user device and the first location. The method may also include detecting, using the wireless interface, that the first user device is on the transit vehicle by periodically polling the first user device during transit from the first location to a second location. The method may include determining, using the wireless interface, the first user device has exited the transit vehicle while the transit vehicle is at or near the second location based at least in part on when the first user device is no longer detected within the wireless detection zone during the periodic polling. The method may also include causing a fare to be calculated for the user of the first user device based on the first location and the second location.

In another aspect, a system for enabling automatic fare payment in transit is provided. The system may include a wireless detection zone comprising a wireless interface. The wireless detection zone may extend to at least a physical boundary of a transit vehicle. The system may also include a processor communicatively coupled with the wireless interface and a memory. The memory may include instructions embodied therein which, when executed by the processor, cause the system to receive, using the wireless interface, an indication that a first user device has checked into the transit vehicle at a first location. The indication may include an identifier of the first user device and the first location. The memory may also include instructions embodied therein which, when executed by the processor, cause the system to detect, using the wireless interface, that the first user device is on the transit vehicle by periodically polling the first user device during transit from the first location to a second location. The memory may further include instructions embodied therein which, when executed by the processor, cause the system to determine, using the wireless interface, the first user device has exited the transit vehicle while the transit vehicle is at or near the second location based at least in part on when the first user device is no longer detected within the wireless detection zone during the periodic polling. The memory may include instructions embodied therein which, when executed by the processor, cause the system to cause a fare to be calculated for the user of the first user device based on the first location and the second location.

In another aspect, a non-transitory computer-readable medium having instructions embedded thereon for enabling automatic fare payment in transit is provided. The instructions may include computer code for causing a computing device to receive, using a wireless interface of a wireless detection zone that extends to at least a physical boundary of a transit vehicle, an indication that a first user device has checked into the transit vehicle at a first location. The indication may include an identifier of the first user device and the first location. The instructions may also include computer code for causing a computing device to detect, using the wireless interface, that the first user device is on the transit vehicle by periodically polling the first user device during transit from the first location to a second location. The instructions may further include computer code for causing a computing device to determine, using the wireless interface, the first user device has exited the transit vehicle while the transit vehicle is at or near the second location based at least in part on when the first user device is no longer detected within the wireless detection zone during the periodic polling. The instructions may include computer code for causing a computing device to cause a fare to be calculated for the user of the first user device based on the first location and the second location.

BRIEF DESCRIPTION OF THE DRAWINGS

FIG. 3C is a simplified block illustration of a non-gated access area with a wireless detection zone, according to certain embodiments.

DETAILED DESCRIPTION OF THE INVENTION

Figure 1:
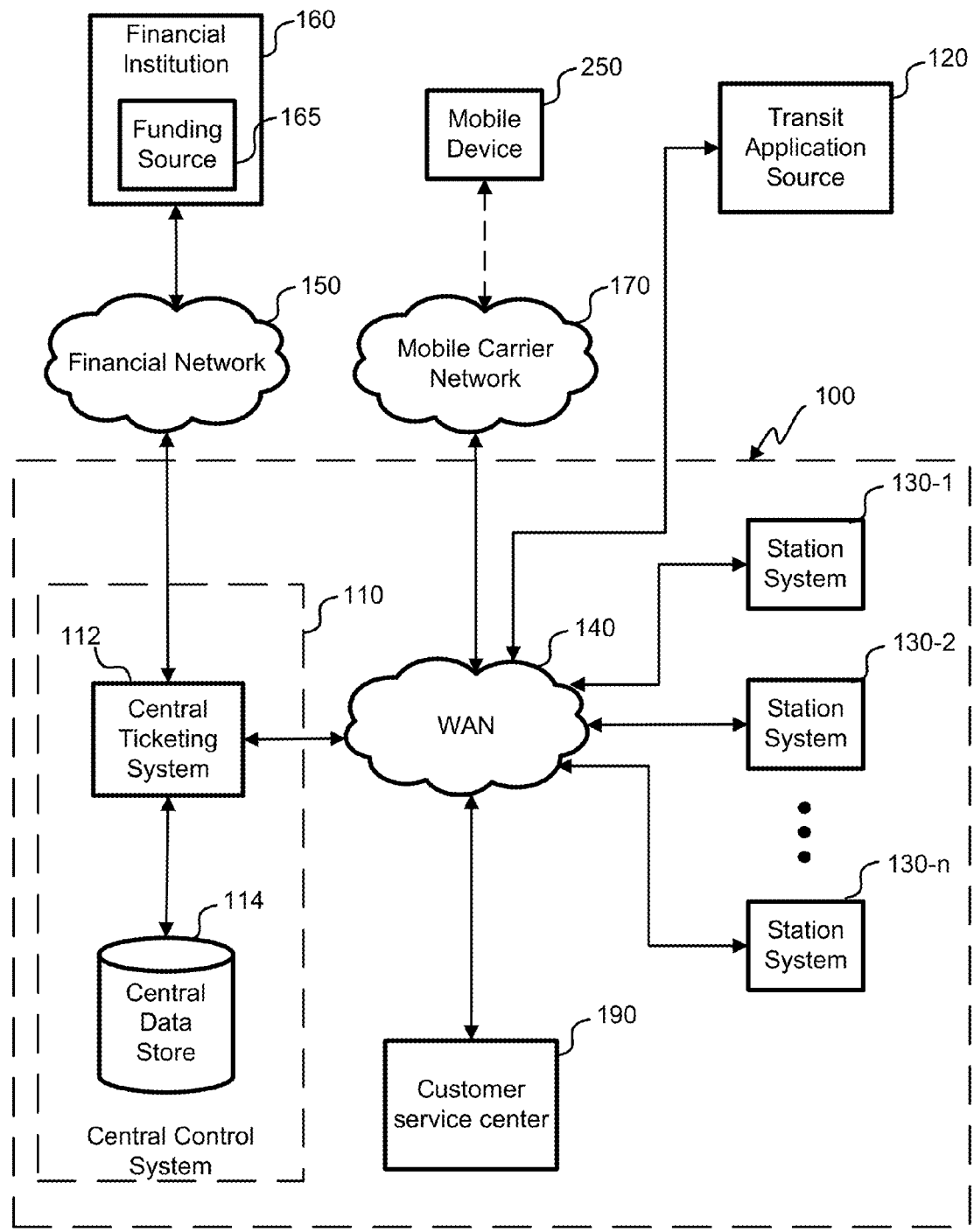
FIG. 1 is a block diagram of an embodiment of a transit system providing transit user accounts for management of transactions of a transit user.

In the following description, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention described herein are directed to enabling a transit and/or transportation vehicle (such as a bus, light rail, commuter rail, trolley, etc.) to detect mobile devices configured for wireless communication and determine if, when, and where such mobile devices enter and exit the transit vehicle. With this information, an associated fare may be calculated and charged in any of a variety of ways. Moreover, information may be sent to the mobile device to provide proof of fare payment. This ultimately allows transit users having mobile devices to use the mobile devices instead of traditional fare media (e.g., fare cards, tickets, etc.). In fact, little or no action and/or input may be required by the transit user—other than entering and exiting the transit vehicle.

The term "fare" used herein can be interpreted broadly to mean any type of value or other indicator associated with a transaction, such as a ride, in a transit system. Fare payment therefore can mean any form of fare settlement, such as a monetary payment, debit and/or credit to an account, and/or any other type of conveyance of value. It should be known that a fare can be based on any of a variety of factors, such as distance, time (e.g., time of day, length of time, etc.), location (e.g., entry and exit locations), entry and/or exit (or any other type of passage) within or related to the transit system, information about a transit user and/or product, etc.

FIG. 1 illustrates a block diagram of an embodiment of a transit system 100, in communication with other systems. The transit system can include various forms of transit, including subway, bus, ferry, trolley, commuter rail, paratransit, etc., or any combination thereof. Some embodiments do not require a transit user account associated with a transit user to allow the transit user to use a mobile device instead of traditional fare media as disclosed herein. However, transit user accounts may be utilized by the transit system to help in management of transactions of transit users and provide additional functionality and features to transit users.

A transit user account can be stored in a database of the system such as central data store 114, and can comprise information regarding a certain user of the transit system 100, such as a name, address, phone number, email address, user identification (such as a unique identifier of the user or other user ID), passcode (such as a password and/or personal identification number (PIN)), a unique identifier associated with a fare media used to identify a user and/or a transit user account (such as a primary account number (PAN)), information regarding user preferences and user opt-in or opt-out selections for various services, product(s) associated with the transit user account, a value and/or credit associated with the product(s), information regarding a funding source 165 for the transit user account (including a financial institution), and more. The transit user account can further comprise funding and transaction information, such as product information, a funding source 165, and a payment amount. A transit user may request a transit user account and provide the information listed above by phone (such as a call to a customer service center 190 maintained and/or provided by the transit service provider of the transit system 100), on the Internet, at ticket booth, at a ticket venting machine, or by other means.

A central ticketing system 112, which can comprise of one or more servers and/or other computing systems having processors, memories, and network interfaces for processing and communicating information. The central ticketing system 112 can use the information provided by the user to create the transit user account, which can be stored and/or maintained on a database, such as a central data store 114 of a central control system 110. It will be recognized that such a transit system 100, and embodiments of the invention described herein, can be enabled for use in applications beyond transit, such as transportation systems (e.g., airline systems, car rental systems, etc.) ticketing (e.g., arenas, theaters, and other event centers), and tolling (e.g., toll roads, high-occupancy vehicle (HOV) and/or commuter lanes, bridges, etc.).

A funding source 165 for a transit user account can provide funding to purchase products of the transit services system. It can be external to the central control system 110 and maintained, for example, by a financial institution 160. Such a funding source 165 may include a savings or checking account, a prepaid account, a credit account, an e-commerce account (such as a PAYPAL® account), or more, which can transfer funds via automated clearing house (ACH) or other means. If a transit user account comprises information regarding a funding source 165 for the account, the central ticketing system 112 can use the information to fund purchases or other transactions of a user of the transit system 100. These transactions can be made at stations, on the Internet, by phone, text, email, or a variety of other different ways, and transaction information can then be sent to the central ticketing system 112 to update the transit user account associated with the transactions and reconcile payments and purchases with the funding source 165. The central ticketing system 112 can communicate with the financial institution 160 (or other entity maintaining the funding source 165) through a financial network 150.

The central ticketing system's reconciliation with a funding source 165 may vary depending on one or more products associated with the transit user account and the functionality desired by a transit services provider. For example, the transit user account may include a running balance mirroring a balance of the funding source 165. In such a case, transactions, such as passage of a user at an access control point and/or the wireless detection of a passenger's ride on a transit vehicle can be recorded and/or tracked by the central ticketing system 112 and reconciled, on a per-transaction basis and/or collectively with other transactions. Along these lines, the central ticketing system 112 may reconcile payment for the transactions with the funding source 165 as the transactions are received and/or on a scheduled basis, such as on an hourly or daily basis.

Additionally or alternatively, when transit products or services are associated with a transit user account, the central ticketing system 112 can draw funds from a funding source 165 less frequently. For example, a transit product can include a certain number of rides or an unlimited number of rides for a certain period of time. In this case, the central ticketing system 112 can track transactions associated with the passage of a user at an access control point (i.e., transactions in the transit system associated with a ride), but may only need to reconcile with the funding source 165 once, for the purchase of the transit product.

The transit user account may further include information regarding a user's preferences with regard to funding. For example, the transit user account may be configured to automatically draw a certain amount of funds from the funding source 165 each month to pay for a certain transit product or service, or to add value and/or credits to an existing transit product or service. The value and/or credits can include a monetary credit, a usage credit, and/or a usage period. Additionally or alternatively, the transit user account can be configured to automatically withdraw a certain amount of funds from the funding source 165 to add additional value and/or credits to an existing product when the value and/or credits of the existing product drops below a certain threshold level. Various other configurations are allowable by the transit user account. It will be understood that other systems of the transit system 100, such as a station system 130, may draw funds from a funding source 165. Moreover, because cash payments can also be used to fund transactions associated with a transit user account, the transit user account may not require financial institution 160.

Fare collection points can exist throughout the transit system 100, such as in stations and/or on transit vehicles. Station systems 130 can gather information regarding transactions and communicate the information to the central ticketing system 112 using a wide area network (WAN) 140. The WAN 140 can include one or more networks, such as the Internet, that may be public, private, or a combination of both. The WAN 140 could be packet-switched or circuit-switched connections using telephone lines, coaxial cable, optical fiber, wireless communication, satellite links, and/or other mechanisms for communication. Communication between the station systems 130 and the central control system 110 may be in real time or periodic. Thus, the usage of fare media throughout the transit system 100 can be tracked.

In the embodiment shown in FIG. 1, a central ticketing system 112 and a central data store 114 are shown for the central control system 110. As discussed above, central ticketing system 112 receives periodic reports upon how credits or debits are being processed throughout the system 100. Additionally, changes in schedules, ticket prices, and delay notifications can be communicated from the central control system 112 to the station systems 130 via the WAN 140.

A mobile device 250 may be communicatively coupled with the central control system 110. Such a mobile device may be a smart phone or other mobile phone (including a near-field-communication (NFC)-enabled mobile phone), a tablet personal computer (PC), a personal digital assistant (PDA), an e-book reader, or other device. In transit system 100, a communicative link from mobile device 250 to central control system 110 can be provided by a mobile carrier network 170, which can include telephony (e.g., mobile phone) service providers, in communication with WAN 140. Additionally or alternatively, as described in additional detail below, a transit vehicle computer having interfaces with which to connect to the mobile device 250, WAN 140 and/or mobile carrier network, can provide a communicative link between mobile device 250 and central control system 110.

According to some embodiments, mobile device 250 can communicate with the central control system 110 to access and/or manage information of a transit user account. Furthermore, the central control system 110 can send messages to the mobile device 250, providing transit, account, and/or advertisement information to a user of the transit system 100 in possession of the mobile device 250. Such messages may be based on, among other things, opt-in or opt-out selections and/or other user preferences as stored in a transit user account.

A transit user can use mobile device 250 to download a transit application from a mobile application source 120. The transit application source 120 may be an application store or website provided by a mobile carrier, the hardware and/or software provider of the mobile device 250, and/or the transit service provider. The transit application can be uploaded or otherwise provided to transit application source 120 by the transit service provider either through the WAN 140 or directly through the mobile carrier network 170. According to some embodiments, the transit application can provide additional functionality of mobile device 250 as described herein, including receiving input from a transit user and providing data to a mobile device 250 before, during, and after a ride on a transit vehicle.

Figure 2:
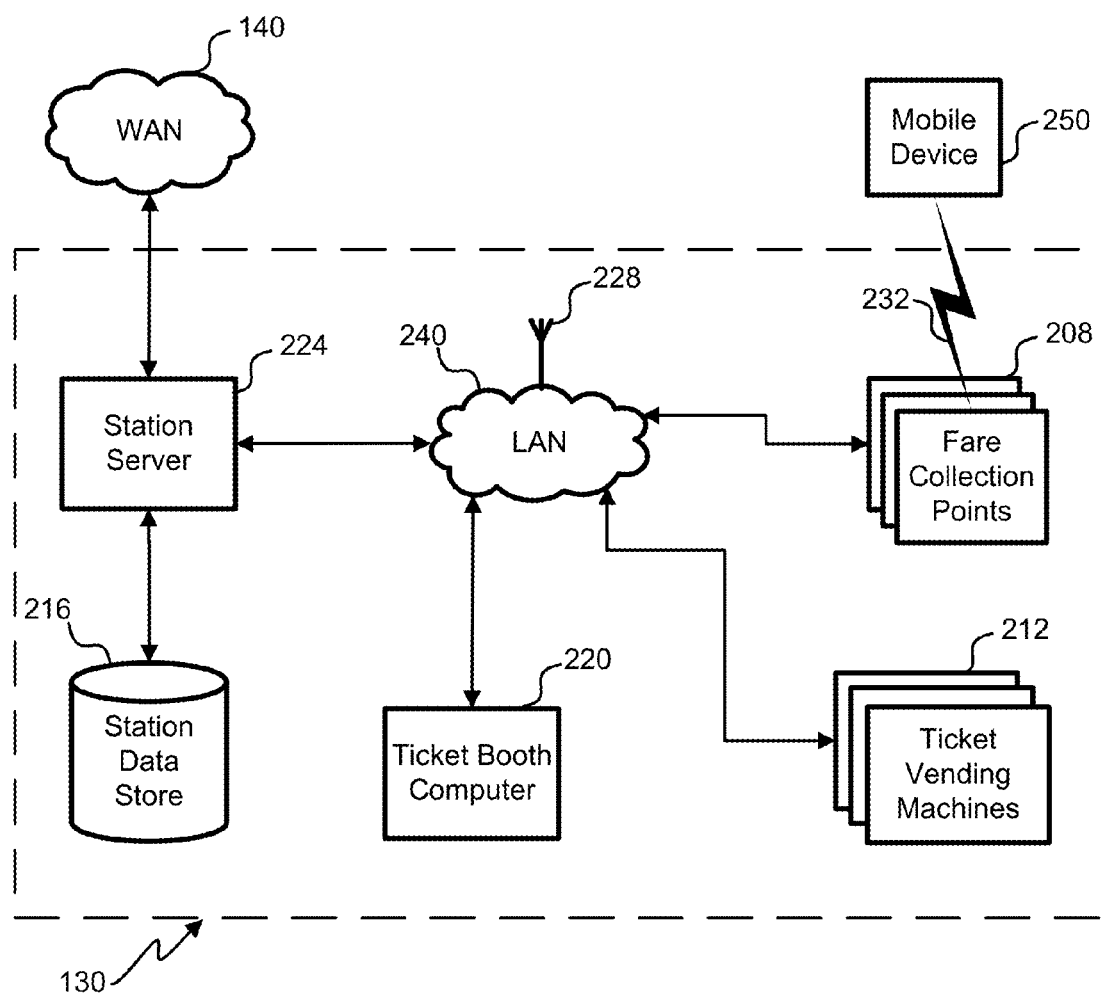
FIG. 2 is a block diagram of an embodiment of a transit station system.

FIG. 2 shows a block diagram of an embodiment of a transit station system 130. As discussed above, transit system 100 can include various forms of transit, such as subway, bus, ferry, commuter rail, trolley, para-transit, and more. Because different forms of transit may require different functionality, various transit station systems 130 may have some or all of the components shown in the block diagram, and additionally may include components not shown in FIG. 2. A local area network (LAN) 240 couples the various systems together and could include point-to-point connections, packet switched connections, wireless connections, and/or other networking techniques.

A station computer server 224 can be coupled to the WAN 140 to allow communication with the central ticketing system 112. Processing of local information can be performed on the station computer server 224. For example, fare information, schedule information, delay update information, and other transit related information can be processed at the computer server 224 and communicated to the various other machines in the transit system 100.

A ticket booth computer 220, fare collection points 208, and ticket vending machines (TVMs) 212 can communicate with the central control system 110 through the station computer server 224 or directly with the central control system 110 through LAN 240 or WAN 140 (e.g., the Internet). According to some embodiments, fare collection points 208 collect information from a transit user at various locations in the transit station system 130, and can come in various forms such as turnstiles, faregates, platform validators, para-transit vehicles, busses, conductor handheld units, and/or fare boxes.

The fare collection points 208 can include mechanisms to prevent a transit user's access to the transit system, or they can permit access and require proof of payment from the transit user once accessed. In either case, fare collection points 208 can communicate with the station server 224 and/or central control system 110 in real time, near-real-time, or afterwards to determine whether to grant a transit user access, calculate a fare charge, report ridership information, and/or provide additional functionality to the transit system 100. This communication can include unique identifiers associated with the fare media used by a transit user, and the unique identifiers can be used to link a transaction with a transit user account. Fare collection points 208, station servers 224, and other systems, such as databases, can include lists of unique identifiers for identification and/or verification purposes. For example the lists can include unique identifiers that are registered with the transit system 100 and/or unique identifiers that have been flagged for fraud, nonpayment, or other misuse. These lists can be updated on a regular basis to reflect transactions associated with unique identifiers throughout the transit system 100.

Fare collection points 208 of the transit system 100 can include transit vehicle computers equipped to read information from a mobile device 250, as described in more detail below. For example, in addition or as an alternative to being equipped to read traditional fare media (e.g., magnetic stripe cards, fobs, contactless smart cards, etc.), fare collection points 208 can employ one or more wireless technologies, such as any of the IEEE 802.11 wireless standards, Bluetooth®, ZigBee®, Global System for Mobile communications (GSM) and/or other mobile telephony standards, and more. Fare collection points 208 thus equipped can therefore communicate wirelessly with various mobile devices 250 (such as mobile phones, notebook computers, tablet computers, personal media and/or music players, personal digital assistants (PDAs), toys, and other portable and/or personal electronics), enabling the mobile devices 250 to be used as fare media to gain access and/or show proof of payment in the transit system 100. (It will be understood that TVMs 212 and ticket booth computers can be similarly equipped for wireless communication.)

All or part of the information communicated by a mobile device 250 can be used as a unique identifier to identify the mobile device 250. This unique identifier can comprise one or more fields of data including or based on information such as a name, a birth date, an identification number (such as a PAN), a social security number, a drivers license number, a media access control (MAC) address, an electronic serial number (ESN), an international mobile equipment identifier (IMEI), an international subscriber mobile identity (IMSI) identifier of a subscriber identity module (SIM), and more. Because the unique identifier is unique, it can be associated with a specific transit user account for transactions within the transit system 100.

In some instances, a unique identifier may be assigned by a transit service provider and stored on the mobile device 250. For example, a transit application running on a mobile phone can generate or otherwise provide a unique identifier to be transmitted from the mobile phone at fare collection points 208 of the transit system 100, such as transit vehicle computers described below. In other instances, if TVM 212 is utilized to enable a user to create a transit user account, the TVM 212 may also write a unique identifier to an unused portion of a memory of the mobile device 250.

Figure 3A:
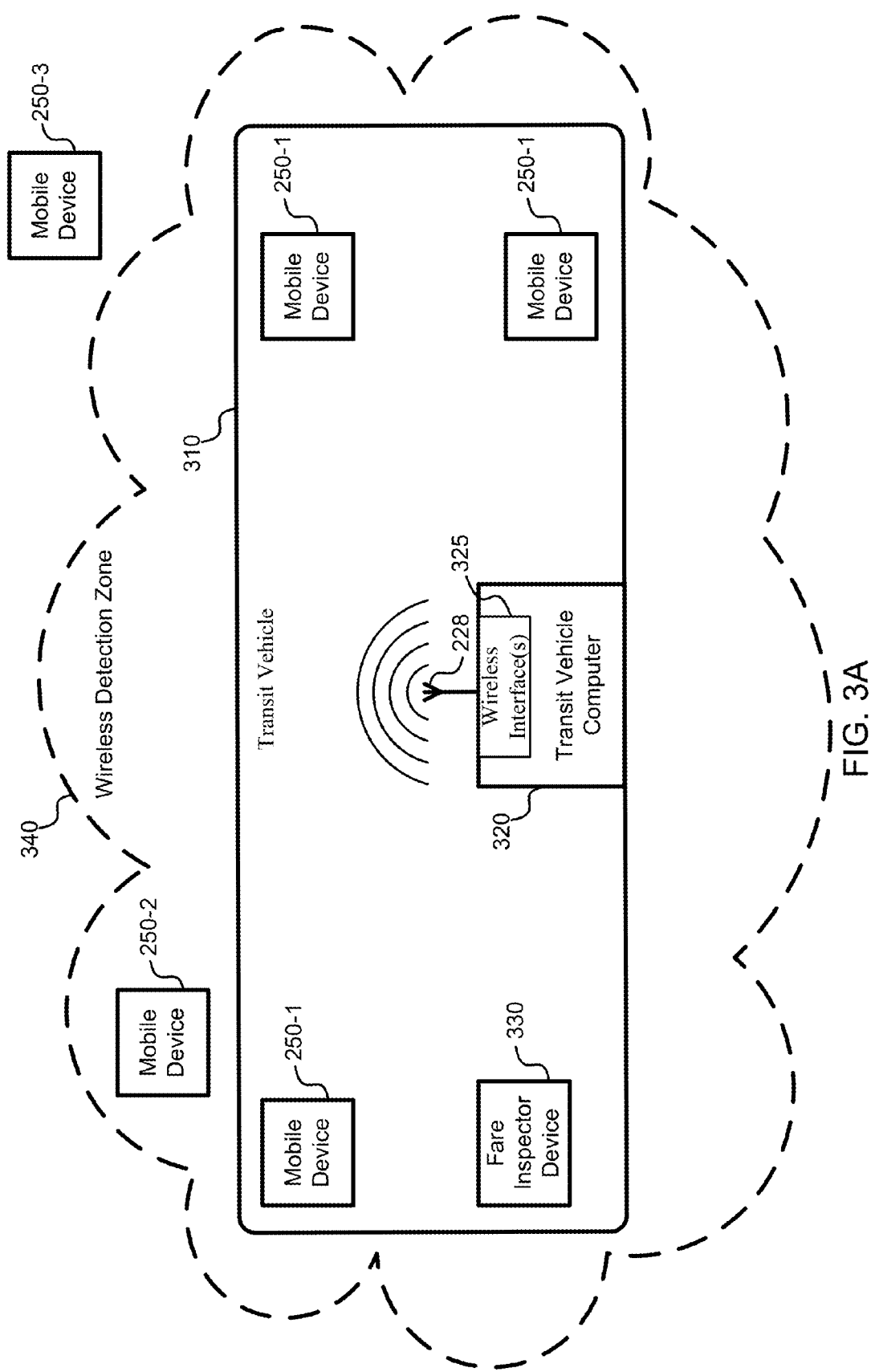
FIG. 3A is a simplified block illustration of a transit vehicle with a wireless detection zone, according to certain embodiments.

FIG. 3A illustrates a simplified block illustration of a transit vehicle 310 with a wireless detection zone 340, according to certain embodiments. A transit vehicle 310 can include, for example, a bus, light-rail car, commuter-rail car, trolley, and/or similar such vehicles. As discussed above, a transit vehicle computer 320 can serve as a fare collection point 208 by collecting fare information wirelessly from mobile devices 250. For instance, transit vehicle computer 320 can include one or more wireless interfaces 325, each of which can use at least one antenna 228 to detect radio frequency (RF signals) from mobile devices 250 inside a wireless detection zone 340 encompassing the transit vehicle 310. As suggested above, the wireless interfaces can employ one or more wireless technologies, such as any of the IEEE 802.11 wireless standards, Bluetooth®, ZigBee®, Global System for Mobile communications (GSM) and/or other mobile telephony standards, and more. It will be understood that concepts conveyed in FIG. 3 can be applied to aspects of a transit and/or transportation system, extending the concept of a wireless detection zone 340 to applications besides transit vehicles 310. For example, detection zones may be located at other "active areas" of a transit and/or transportation system.

Detection of a passenger can be performed in a variety of ways and may vary depending on the functionality of the transit vehicle computer 320. Mobile devices 250, such as cell phones, typically transmit wireless (e.g., RF) signals to, for example, exchange information with a cell in a mobile telephony network and/or detect and connect with a local area or other network. This enables the transit vehicle computer 320 to detect mobile devices 250 within an operating range of antenna 228 defining the wireless detection zone 340.

Although the wireless detection zone 340 shown in the embodiment of FIG. 3 extends beyond the physical boundaries of the transit vehicle 310, the boundaries of the wireless detection zone 340 may vary depending on functionality, cost, and other considerations. The wireless detection zone 340 may include, for example, only a portion of the transit vehicle 310. In other embodiments, the wireless detection zone 340 may include the exact or approximate boundaries of the transit vehicle 310. Establishing the boundaries of the wireless detection zone 340 can include methods such as using software and/or hardware functionality of the transit vehicle computer 320 (and/or wireless interface(s) 325) to determine a distance of a mobile device 250 to the antenna 228, using dedicated hardware proximity sensors coupled with the mobile devices and transit vehicle 310, and/or utilizing multiple antennas communicatively coupled with the transit vehicle computer 320 to triangulate the position of a mobile device 250 relative to the transit vehicle 310. The transit vehicle computer 320 can use the information transmitted by the mobile device 250 to determine a unique identifier for each mobile device, as discussed above. Thus, the transit vehicle computer 320 can track multiple mobile devices 250 in the wireless detection zone 340 individually.

Other information sources can be used to help determine the position of a mobile device 250 relative to the transit vehicle, as discussed below. However, the distance of the mobile device 250 as determined by a transit vehicle computer 320 coupled with a single antenna 228, along with current location information, often can be enough to provide an accurate determination of whether a mobile device 250 is on a transit vehicle 310. To improve accuracy, the transit vehicle computer 320 can poll the wireless detection zone 340 a plurality of times while the transit vehicle 310 is at a plurality of locations. As used herein, the term "poll" can include both actively interrogating wireless devices for communication and passively "listening" for wireless communication.

Using the embodiment shown in FIG. 3A as an example, mobile devices 250-1 along with mobile device 250-2 are within the boundaries of the wireless detection zone 340, so the transit vehicle computer 320 can make an initial determination that these devices may be associated with transit users who have boarded the transit vehicle 310. Because mobile device 250-3 is outside the wireless detection zone 340, it will not be considered by the transit vehicle computer 320. After the transit vehicle 310 moves to a different location, such as on the route to another stop, the transit vehicle computer 320 can poll the wireless detection zone 340 again to determine which mobile devices 250 are located therein. Because mobile device 250-2 was located outside the transit vehicle 310 initially, it most likely will no longer be within the boundaries of the wireless detection zone 340. The transit vehicle computer 320 will determine that mobile device 250-2 was never on the transit vehicle 310, and therefore should not be charged a fare.

Polling of the wireless detection zone 340 by the transit vehicle computer 320 not only can determine which mobile devices 250 are on the transit vehicle 310, but when the transit users carrying the mobile devices 250 board and exit the transit vehicle. For instance, the transit vehicle computer 320 can determine a transit user has boarded the transit vehicle 310 at a first designated stop of the transit vehicle 310 by detecting an associated mobile device 250 at the first designated stop and verifying, at one or more locations along the transit vehicle's route, that the mobile device is still within the boundaries of the wireless detection zone 340. The transit vehicle computer 320 can, for example, log an entry event associated with the mobile device 250. If the transit vehicle computer 320 no longer detects the mobile device 250 after a second designated stop of the transit vehicle, the transit vehicle computer 320 can determine that the transit user associated with the mobile device 250 has exited the transit vehicle. The transit vehicle computer can then log an exit event associated with the mobile device 250. With both entry and exit events, the transit vehicle computer 320 can determine an associated fare or transmit the information for fare calculation. The transit vehicle computer 320 can also store and/or transmit related information for processing and/or reporting requirements, such as vehicle number, date, time, location, direction, and more.

Figure 3B:
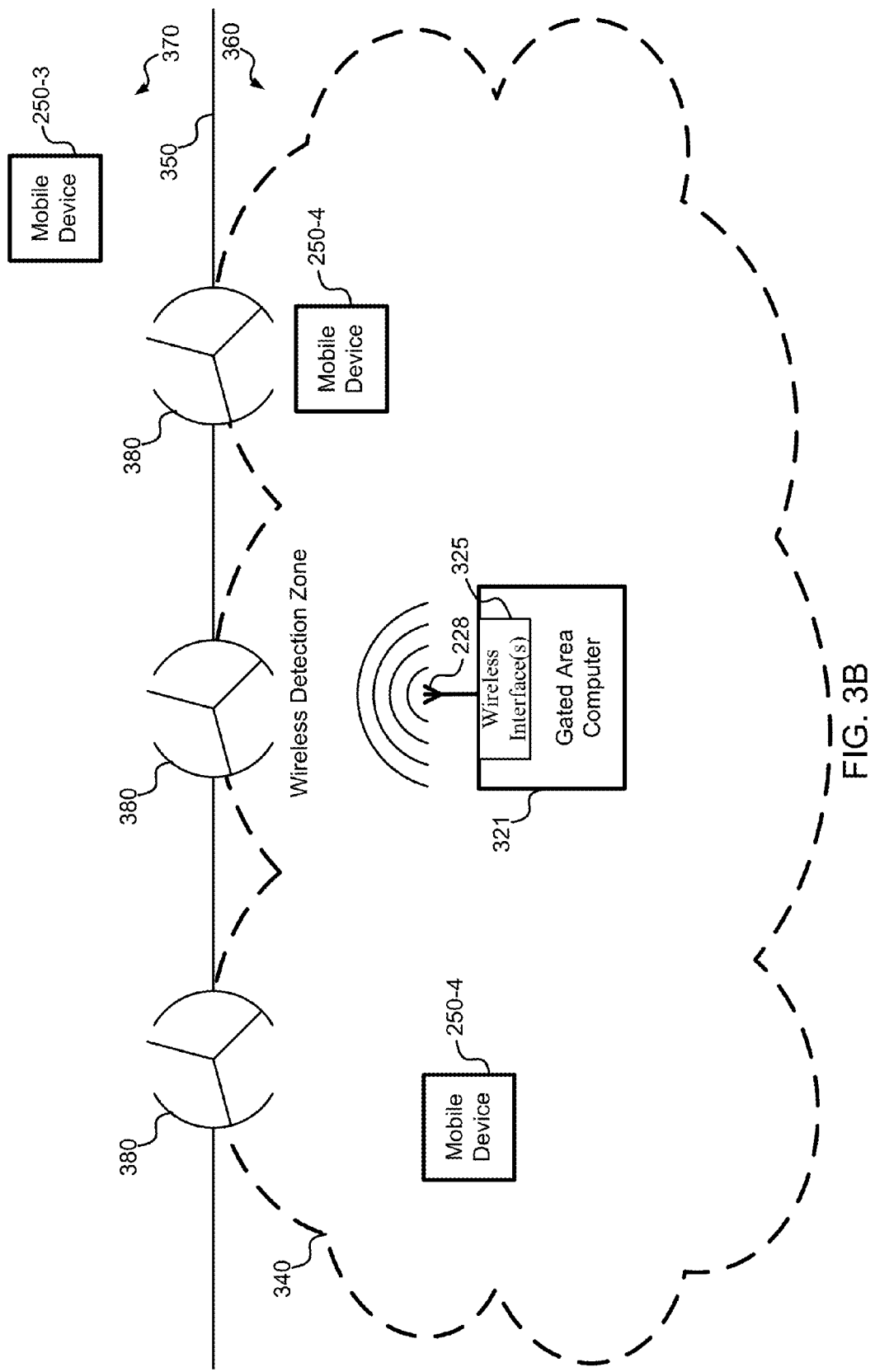
FIG. 3B is a simplified block illustration of a gated access area with a wireless detection zone, according to certain embodiments.

FIG. 3B is a simplified block illustration of a gated access area with a wireless detection zone 340, according to certain embodiments. The gated access area, which can be located anywhere in the transit system 100, such as a gated transit station. It can further comprise a gated area computer 321. As with the transit vehicle computer 320 of FIG. 3A, the gated area computer 321 can include wireless interface(s) 325 and antenna(s) 228 that can establish a wireless detection zone 340.

A gated access area with a wireless detection zone 340 can include a barrier 350 that establishes a border between a fare zone 360 (in which a transit user may be required to pay a fare) and a non-fare zone 370 (in which transit users may not be required to pay a fare. The barrier can include gates 380 through which transit users can move from one zone to the other.

The wireless detection zone 340 can be located wholly within the fare zone 360, as shown in FIG. 3B, or it may be partially or wholly located within a non-fare zone 370, located at, for example, exit and/or entry gates of a transit station. Functionality of the gated area computer 321 can vary depending on the location of the wireless detection zone 340 in relation to a fare zone 360 and/or a non-fare zone 370. For example, if the wireless detection zone 340 is wholly located within fare zone 360 as shown in FIG. 3B, the gated area computer 321 can compute a fare and/or conduct other actions based solely on the detection of a mobile device 250 within the wireless detection zone 240. On the other hand, if the wireless detection zone 340 is partially or wholly located within a non-fare zone 370, the gated area computer 321 may need to determine a more precise location for a mobile device 250 (e.g., within fare zone 360, entering into or exiting from fare zone 360, etc.) before taking any further action.

Similar to the transit vehicle computer 320 of FIG. 3A, the gated area computer 321 can determine mobile devices 250-4 in the wireless detection zone 340. It can also ignore mobile devices 250-3 outside the wireless detection zone 340. If the gated area computer 321 determines a mobile device 250 is in fare zone 360, it can calculate a fare based on this determination. As with other embodiments detailed herein, one or more systems and/or devices can be involved in fare calculation, and the fare can depend on numerous factors in addition to the detection of a mobile device 250 in a fare zone 360.

FIG. 3C is a simplified block illustration of an open access area with a wireless detection zone 340, according to certain embodiments. This illustration mirrors FIG. 3B, but demonstrates how a similar setup can be used where there is no barrier 350 or gates 380. Instead, the boundary between fare zone 360 and non-fare zone 370, if indicated at all, can be indicated by some demarcation, sign, and/or other feature 355 and an open area computer 322 can determine mobile devices 250-4 within, entering, and/or exiting the fare zone 360.

Figure 3D:
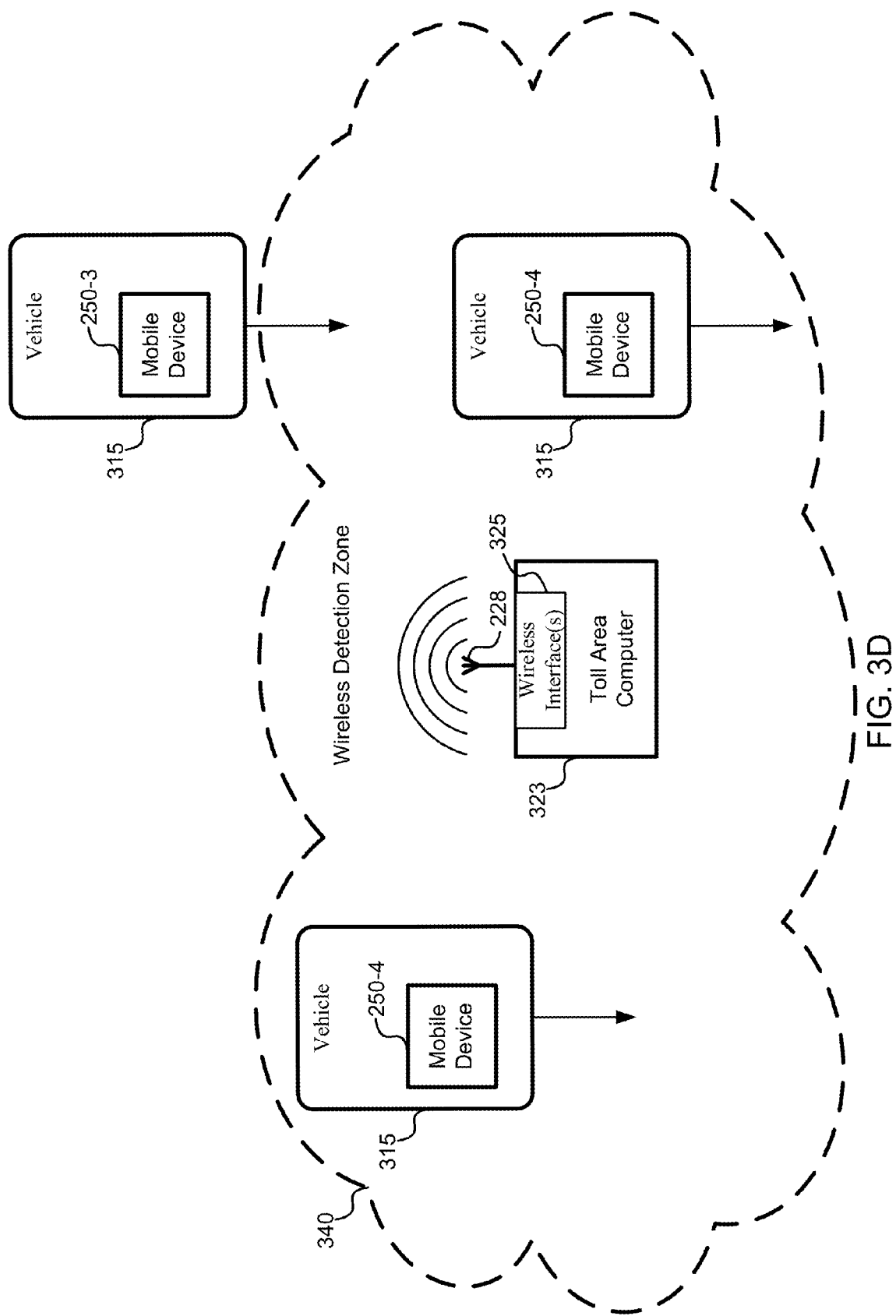
FIG. 3D is a simplified block illustration of a toll area with a wireless detection zone, according to certain embodiments.

FIG. 3D is a simplified block illustration of a toll area with a wireless detection zone 340, according to certain embodiments. This illustration demonstrates how the invention may be applied to toll and/or similar systems. A toll area computer 323, for example, can be located on or near a road and/or other route through which vehicles 315 travel. The toll area computer 323 can detect mobile devices 250-4 passing through wireless detection zone 340 and calculate a toll and/or other value for a vehicle and/or person associated with the mobile device 250-4. Alternatively, the toll area computer 323 can send information to a remote system (not shown) for toll calculation and/or further processing, similar to the other computers described herein.

Figure 4:
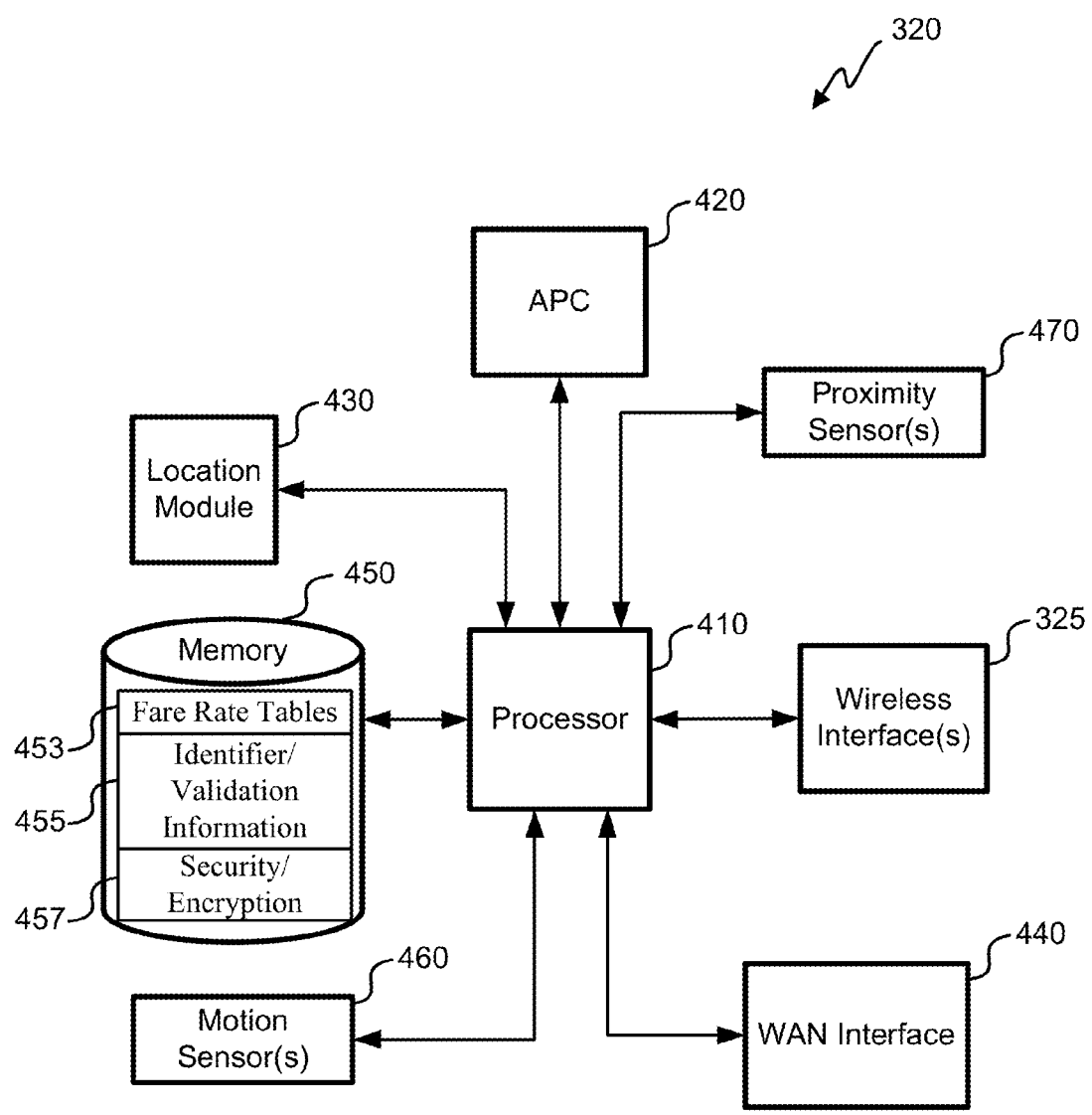
FIG. 4 is a block diagram of an embodiment of a transit vehicle computer that can be used to establish a wireless detection zone and/or otherwise facilitate wireless fare collection.

FIG. 4 illustrates a block diagram of a transit vehicle computer 320, according to some embodiments. The transit vehicle computer 320 can include a processor 410 for processing information provided by various components of the transit vehicle computer 320. It will be understood that communication between components and the processor 410 can include various technologies such as optical, wireless, wired, and/or other inter- and intra-system communication technologies.

As illustrated, the processor 410 can be communicatively coupled with a memory 450. Among other things, such as an operating system, programming code, and/or other instructions, the memory 450 can include fare rate tables to enable the transit vehicle computer to calculate a fare rate based on entry and/or exit events associated with a mobile device 250. These fare rate tables 453, along with any other information in the memory, can be updated, periodically or in real time, to reflect up-to-date information and/or changes of the transit system 100.

The memory can also include identifier/validation information 455. The identifier/validation information 455 can be used to identify and/or validate a unique identifier associated with a mobile device 250. It can include, for instance, information regarding generating a unique identifier for a mobile device (e.g., whether to use a MAC address by itself or whether to use it—or a truncated and/or altered version— in combination with other data). Additionally or alternatively, the identifier/validation information 455 can include validation information regarding certain mobile devices 250, such as the unique identifier of blacklisted mobile devices 250, thereby enabling the transit vehicle computer to communicate denial of fare or similar information to a fare inspector device, central system, and/or the associated mobile device 250.

Encryption and/or other security measures may be taken to mitigate fraud and protect communicated information. Corresponding security/encryption information 457 can be included in the memory 450. As with the other information in the memory, the security/encryption information 457 can be updated regularly or as needed. Such updates can include new security keys and/or new encryption methods to help ensure the continued security of the system.

As indicated above, the transit vehicle computer 320 can also include one or more wireless interfaces 325. The wireless interface(s) 325 can be used individually or in combination to detect and/or communicate with mobile devices 250 on the transit vehicle 310. As discussed above, such wireless interfaces 325 can employ one or more wireless technologies, such as any of the IEEE 802.11 wireless standards, Bluetooth®, Global System for Mobile communications (GSM), General Packet Radio Service (GPRS), Code Division Multiple Access (CDMA), Wideband Code Division Multiple Access (W-CDMA), and/or other mobile telephony standards, and more. Where mobile telephony is used, a small cellular base station can provide a wireless interface 325 to communicate with mobile devices 250 in and/or around the transit vehicle 310. Qualcomm Deployable Base Station (QDBS) products by Qualcomm®, for example, can be used to provide CDMA communication.

Additionally, the transit vehicle computer 320 can include one or more proximity sensors 470, such real-time locating systems (RTLS), to help determine the location of a mobile device 250 in relation to the transit vehicle 310. RTLS systems can include, but are not limited to, active radio frequency identification (RFID), infrared (IR), semi-active RFID, ZigBee®, ultrasound identification, triangulation, and more. Such proximity sensors 470 can directly communicate with similar sensors on a mobile device 250, or may be used to provide information transmitted with wireless interface(s) 325. Proximity sensors 470 can improve the accuracy of transit vehicle computer 320 in detecting whether a mobile device 250 is on a transit vehicle 310.

The transit vehicle computer 320 can also include an automatic passenger counter (APC). Wireless interface(s) 325 can detect the number of mobile devices 250 on or near a transit vehicle 310. However, because not every transit user may have a mobile device equipped to communicate with wireless interface(s) 325, the APC 420 may be used to complement the information gathered by the wireless interface(s) 325. If, for example, the transit vehicle computer 320 detects a large discrepancy between the number of mobile devices 250 detected by the wireless interface(s) 325 and the number of transit users detected by the APC, the transit user can log the discrepancy and/or communicate discrepancy information to a central system (e.g., central control system 110) for potential inspection by a fare inspector. It will be understood that APCs can utilize various technologies, such as optical and/or pressure sensing technologies, and may be integrated into and/or coupled with the transit vehicle computer 320 using various means.

A location module 430 and motion sensor(s) 460 also can be included in and/or coupled with the transit vehicle computer 320. The location module, such as a Global Positioning System (GPS) receiver located on the transit vehicle 310, can provide the transit vehicle computer 320 with updated location information regarding the location of the transit vehicle 310. Such information can be used to determine whether a mobile device 250 is located on or off the transit vehicle 310 by, for example, comparing location data of the transit vehicle with location data communicated by the mobile device 250.

Additionally or alternatively, as discussed in more detail below, location information may be used to provide information specific to the location of the transit vehicle 310. Location information can be used, for example, with fare rate tables 453 to send up-to-date fare information to a mobile device 250 via the wireless interface(s) 325. Moreover, additional location-specific information, located in the memory (not shown) or communicated via the wide area network (WAN) interface 440, also can be transmitted to a mobile device 250. Such location-specific information can include coupons and/or advertisements from local businesses and/or organizations, historical and/or geographical information, the location of the next stops of the transit vehicle 310, and more.

The motion sensors can be used to help determine the location of a mobile device 250 relative to a transit vehicle 310 and/or to complement the other information collected by the transit vehicle computer 320. For instance motion sensors, such as accelerometers, can be used to sense bumps in the road. Using this data, in conjunction with accelerometer data from a mobile device 250 and/or the speed of the transit vehicle, the transit vehicle computer 320 can more accurately determine whether a mobile device 250 is located on the transit vehicle 310, or simply in a nearby vehicle.

The transit vehicle computer 320 additionally can include a WAN interface 440, enabling the transit vehicle computer 320 to communicate with systems and/or networks remote to the transit vehicle. The WAN interface 440 can include, for example, a GSM or other telephony connection to enable access to a telephony network and/or other WAN 140, such as the Internet. Thus, the WAN interface 440 can enable the transit vehicle computer 320 to connect with devices and systems not located in the transit vehicle. This can include databases and systems in the transit system 100, such as the central control system 110. Moreover, the WAN interface 440 also may allow mobile devices 250 connected with the transit vehicle computer 320 via wireless interface(s) 440 to with the telephony network and/or other WAN 140 to which the WAN interface 440 is connected. Additionally or alternatively, according to some embodiments, the mobile device 250 may communicate using its mobile telephony or other data network directly with remote systems of the transit system 100, such as a central computer, thereby enabling remote systems of the transit system 100 to receive data directly from a mobile device 250. It will be understood that different components of the transit vehicle computer 320 may be combined, depending on functionality. A mobile telephony base station can, for example, provide functionality of both a wireless interface 325 and a WAN interface 440. Moreover, RF-based technologies such as Zigbee® and/or Bluetooth® can function as either or both of a wireless interface 325 and a proximity sensor 470, according to some embodiments.

Figure 5:
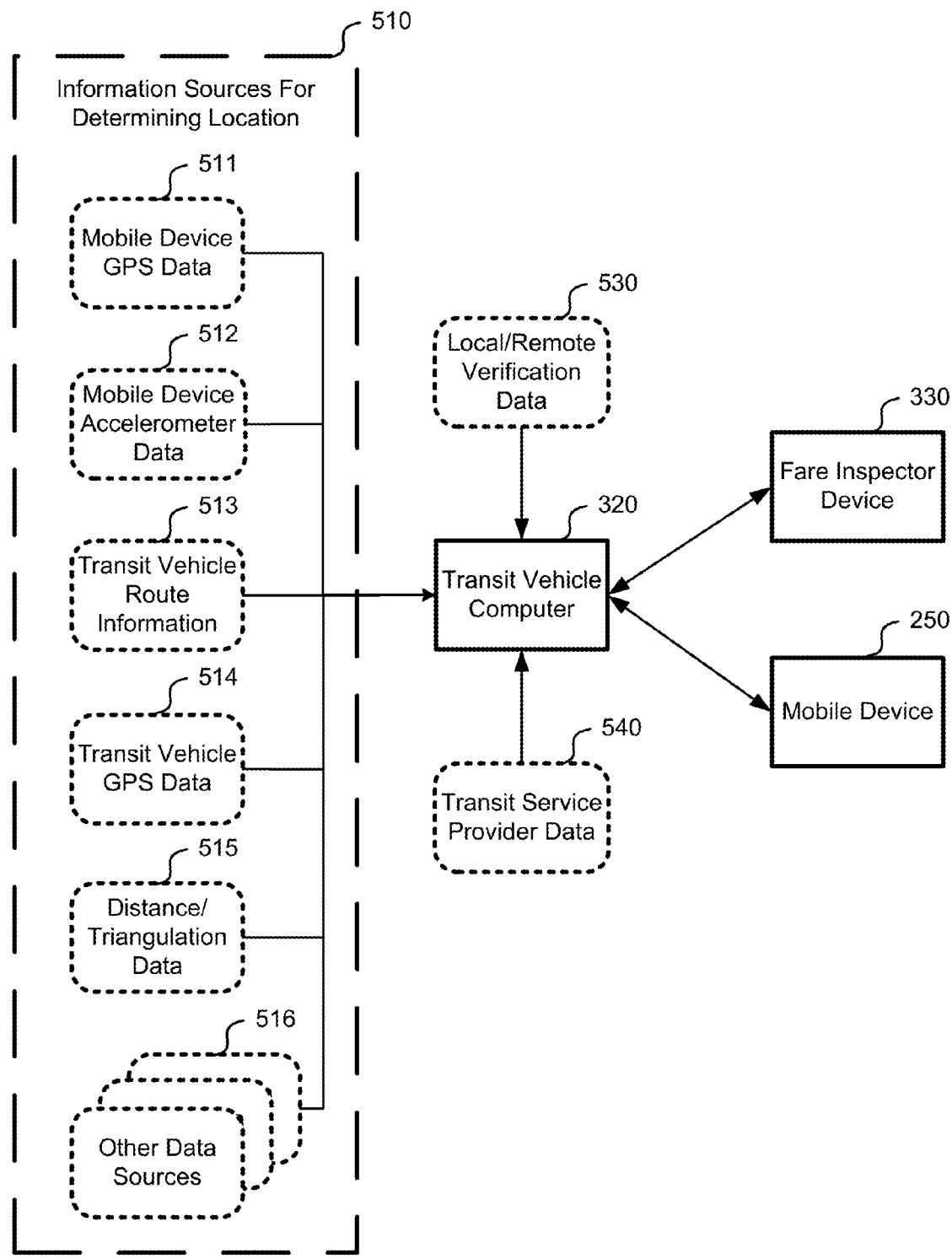
FIG. 5 is a block diagram illustrating information sources which can be utilized by a transit vehicle computer, according to some embodiments.

FIG. 5 is a block diagram illustrating information sources which can be utilized by a transit vehicle computer 320, according to some embodiments. As discussed in further detail below, the transit vehicle computer 320 can gather various information from sources for determining location 510, as well as local/remote verification data 530 and/or transit service provider data 540. This information can be used to calculate and/or otherwise generate information to communicate with other systems and/or devices in the transit system 100, such as a fare inspector device 330 and/or mobile device 250.

One information source for determining location can be mobile device GPS data 511. With the prevalence of location modules, such as GPS receivers, integrated into mobile devices 250 such as mobile phones, tablet computers, mobile gaming systems, etc., the transit vehicle computer 320 can readily utilize GPS data generated and communicated by such a mobile device 250 to improve the accuracy of determining the location of the mobile device 250 with respect to a transit vehicle 310. The route and/or type of transit vehicle should be a factor when implementing a transit vehicle computer 320 that utilizes mobile device GPS data 511 (e.g., mobile devices 250 may not generate GPS data while a transit user is at an underground subway stop). Another consideration is, because mobile devices 250 typically do not transmit GPS data, a transit user may need to download and install a specialized transit application onto the mobile device 250. The transit application can be configured to provide the desired GPS data when the mobile device 250 is communicatively connected with the transit vehicle computer 320. Such an application is described in further detail below.

In a manner similar to utilizing mobile device GPS data 511, the transit vehicle computer 320 also can utilize mobile device accelerometer data 512. As discussed above, motion sensors can be used on the transit vehicle 310 by the transit vehicle computer 320 to more accurately determine the location of the mobile device 250 in relation to the transit vehicle 310. Such a determination can include comparing motion sensed by motion sensors 460 on the transit vehicle 310 with mobile device accelerometer data 512. For example, where a transit vehicle is a bus, and motion sensors 460 detect a bump on a road before a bump is detected by a mobile device 250, it may indicate that the mobile device 250 is not on the bus. Such detection can take into account various factors, such as movement of the mobile device 250 by a transit user, motion of a first portion of the transit vehicle 310 being different than a second portion of the transit vehicle 310 (e.g., front of the bus compared to the back of the bus), etc.

Transit vehicle route information 513 may also be utilized by the transit vehicle computer 310 to determine location of a mobile device 250 in relation to the transit vehicle 310. For example, in systems where a wireless detection zone 340 extends beyond the physical boundaries of the transit vehicle 310, also providing GPS information of a mobile device 250, transit vehicle 310, and route, the transit vehicle computer 320 can determine the mobile device 250 is not on board the transit vehicle 310 if the mobile device 250 is at a location that does not correlate to the current location of the transit vehicle 310 or a location along the designated route. Such route information can be stored, for example, in memory 450 of the transit vehicle computer 320. Additionally or alternatively, route information may be used to send local information to a transit user. As discussed above, local information can include fare information, information regarding upcoming or passed stops, advertisements from local businesses and/or organizations, and more.

As discussed herein, a transit vehicle computer 320 can utilize transit vehicle GPS data to help determine whether a mobile device 250 is on the transit vehicle 310. It can compare, for example, the GPS location of the mobile device 250 with the GPS location of the transit vehicle 310. Additionally or alternatively, the transit vehicle can utilize this information to determine the transit vehicle's general location on (or off) a designated transit route.

The transit vehicle computer can additionally utilize distance/triangulation data 515 for determining location of a mobile device 250 in relation to the transit vehicle 310. For example, the wireless interface(s) 325 of the transit vehicle computer 320 can include and/or be coupled with multiple antennas or other wireless devices. These antennas can be located at known positions relative to the transit vehicle 310, and could use directional and/or triangulation techniques to make a more precise determination of whether a mobile device 250 is on the transit vehicle 310. As discussed above, distance data can be utilized in addition or as an alternative. Distance data can include the use of the proximity sensors 470 and/or wireless interface(s) 325.

FIG. 5 also indicates other data sources 516 may be utilized in determining location information of a mobile device 250 relative to a transit vehicle. One such data source could be the transit user. For instance, where a mobile device 250 has an application installed thereon providing for user input, the transit vehicle computer 320 could, after detecting the mobile device 250, send information to the mobile device 250 requesting user input. For example, the mobile device could request confirmation by a transit user whether the transit user has boarded a transit vehicle 310. Such confirmation would be relayed by the mobile device 250 back to the transit vehicle computer 320. Similar functionality may be achieved without an application through, for example, short message service (SMS) (e.g., "text") messaging.

The transit vehicle computer 320 can utilize additional sources of data, depending on desired functionality. For instance, the transit vehicle computer 320 can utilize local and/or remote verification data to verify a unique identifier associated with a mobile device 250. Local verification information may be stored in the identifier/validation information 455 of the memory 450. Remote verification data can be received from the central control system 110 through the WAN interface 440 of the transit vehicle computer 320. Transit service provider data 540 can include updated fare rate, validation, and/or security information, advertisement information, alerts and/or notices, schedule changes, delays, etc.

Figure 6A:
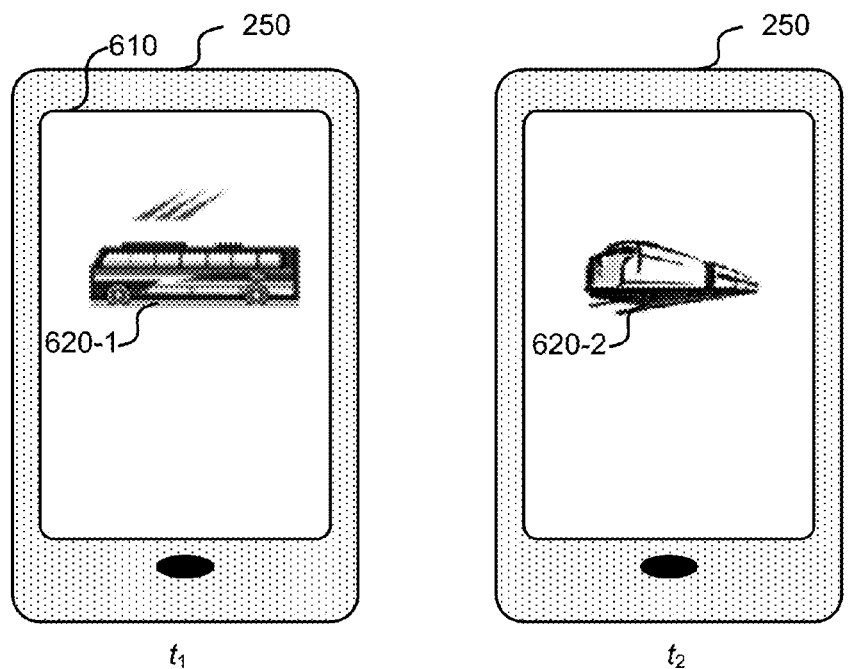
FIG. 6A is a simplified illustration of how a mobile device can display different fare payment indicators at different times, according to some embodiments.
Figure 6B:
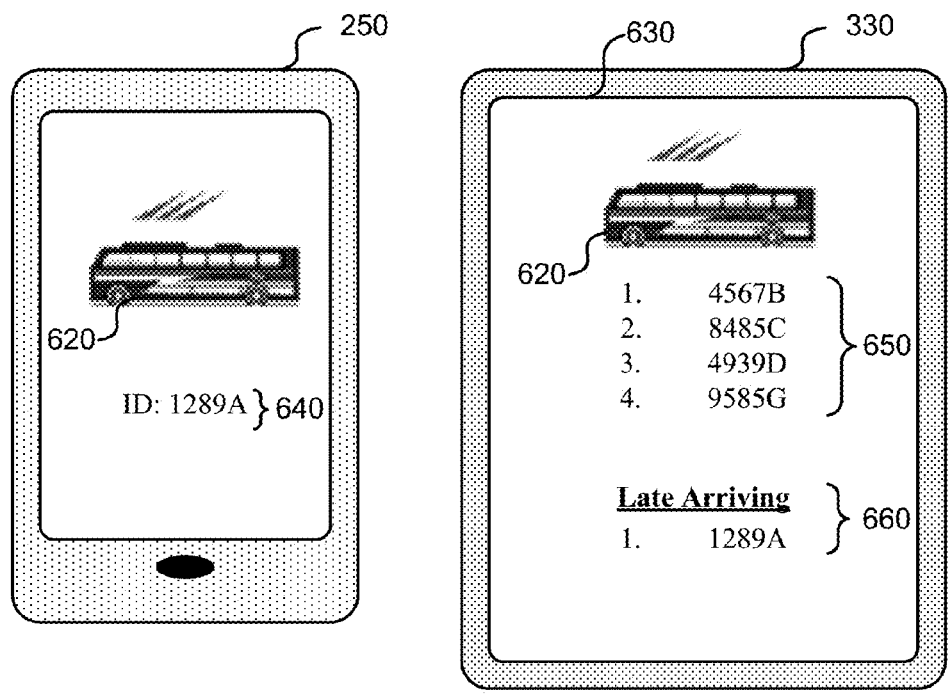
FIG. 6B is a simplified illustration of how, according to some embodiments, a fare inspector device can display the fare payment indicator, list unique identifiers associated with mobile devices, and indicate possible fraud of certain mobile devices.

FIGS. 6A-6B illustrate how a transit system 100 can provide a fare payment indicator 620 in transit systems 100 utilizing proof-of-payment type transit functionality. Although embodiments described herein contemplate various forms payment verification, a fare payment indicator 620 enables a fare inspector to verify payment visually, which can be a quick and simple form of payment verification. For instance, after communicating with a mobile device 250 and performing any additional verification, a transit vehicle computer 320 can send information to the mobile device 250 causing the mobile device 250 to show, on a display 610 of the mobile device 250, a fare payment indicator 620-1 for time $t_1$. Moreover, to mitigate fraud, the transit vehicle computer 320 can cause the mobile device 250 to display a second fare payment indicator 620-2 at time $t_2$. It will be understood that any number of different fare payment indicators 620 may be used, and they may be updated at any time with any frequency including the use of moving indicators so as to prevent pictures or clones of the indicator (i.e. dynamic indicators). For example, a transit vehicle computer 320 can be configured to update the fare payment indicator at every stop of the transit vehicle, at regular intervals (e.g., every minute, hour, day, or dynamic and moving, etc.), at random intervals, at certain locations, etc. Changing the fare payment indicator 620 in this manner makes it difficult for someone to try to copy an indicator and cheat the system.

It will be understood that, although FIGS. 6A and 6B show fare payment indicator 620 as an icon, the fare payment indicator 620 can be any visual indication of proof of payment. For example, the fare payment indicator 620 can be a number, name, word, code, picture, animation, video, or any combination thereof. According to some embodiments, the fare payment indicator can comprise a bar code. Such a visual indicator shown on the display 610 of a mobile device 250 can allow a fare inspector to visually verify proof of payment.

Information provided by the transit vehicle computer 320 causing a mobile device 250 to update a fare payment indicator 620 can vary, depending on the desired functionality of the system and available bandwidth and/or processing power of the devices involved. Fare payment indicators 620 may be stored by the mobile device 250 beforehand, for example, and the transit vehicle computer 320 can simply indicate to the mobile device 250 which fare payment indicator 620 to display. Additionally or alternatively, the transit vehicle computer 320 can transmit a fare payment indicator (e.g., a text file, a .jpg file, .avi, etc.) itself.

FIG. 6B illustrates how a fare inspector device 330 may be utilized as well. The fare inspector device 330 can include any number of devices similar to mobile devices 250 (e.g., mobile phones, tablet computers, netbook computers, hand held computer, etc.) as well as devices having specialized equipment for providing particular functionality to the fare inspector (e.g., bar code scanner, magnetic stripe reader, NFC, or contactless smart card reader, etc.). The fare inspector device 330 can communicate with the transit vehicle computer 320 wirelessly, in a similar manner as mobile devices 250, and can include software specific to the fare inspector device 330 that enables the fare inspector device 330 to receive additional information from the transit vehicle computer 320.

Information provided to the fare inspector device 330 can vary depending on desired functionality. For instance, as illustrated in FIG. 6B, the fare inspector device 330 can receive information from the transit vehicle computer 320 causing the fare inspector device 330 to show the current fare payment indicator 620 on a display 530. This enables a fare inspector to have an accurate reference of the current fare payment indicator 620 with which to compare the fare payment indicators 620 shown on mobile devices 250 of transit users. If a current fare payment indicator 620 is not shown by the mobile device 250, it can suggest to the fare inspector that the transit user to whom that mobile device 250 belongs has not paid the fare.

Additionally, FIG. 6B illustrates how identification codes may be shown on a mobile device 250 and a fare inspector device 330 to allow a fare inspector to identify a particular mobile device. This can further deter fraud. For example, a transit user attempts to cheat the system by turning on the mobile device (or deactivating wireless functionality) until the fare inspector enters the vehicle. This fraud method would minimize the fare paid in systems where fare price increases the longer a transit user is on a transit vehicle 310. However, because the transit vehicle computer 320 can uniquely identify each mobile device 250 with a unique identifier, the transit vehicle computer can be configured to determine which mobile devices 250 were turned on or otherwise activated when the fare inspector enters the transit vehicle 310. An identification code can be shown on a portion 640 of the mobile device 250, and a fare inspector device 330 can show corresponding "late arriving" identification codes 660, as well as presumably valid identification codes 650. The identification codes assigned to the mobile devices 250 can be the unique identifiers associated with the mobile devices 250, generated based on the unique identifier information, or can be altogether independent of the unique identifiers.

Numerous variations on the display and verification of fare payment indicators are contemplated. For instance, different fare payment indicators 620 may be shown on different mobile devices 250, indicating, for example, different fare types and/or different fare products. Additionally or alternatively, the display of the fare payment indicator may be automatic, or may be user-initiated. If a mobile device 250 comprises a mobile phone, for example, a transit application configured to show the fare payment indicator 620 can also be configured to allow the transit user to accept and/or make telephone calls on the mobile phone, which can include removing the fare payment indicator 620 from the mobile phone's display. Likewise, if proof of payment is required, the transit application can be configured allow a transit user to display the fare payment indicator 620 after it has been removed from the mobile phone's display.

Figure 7A:
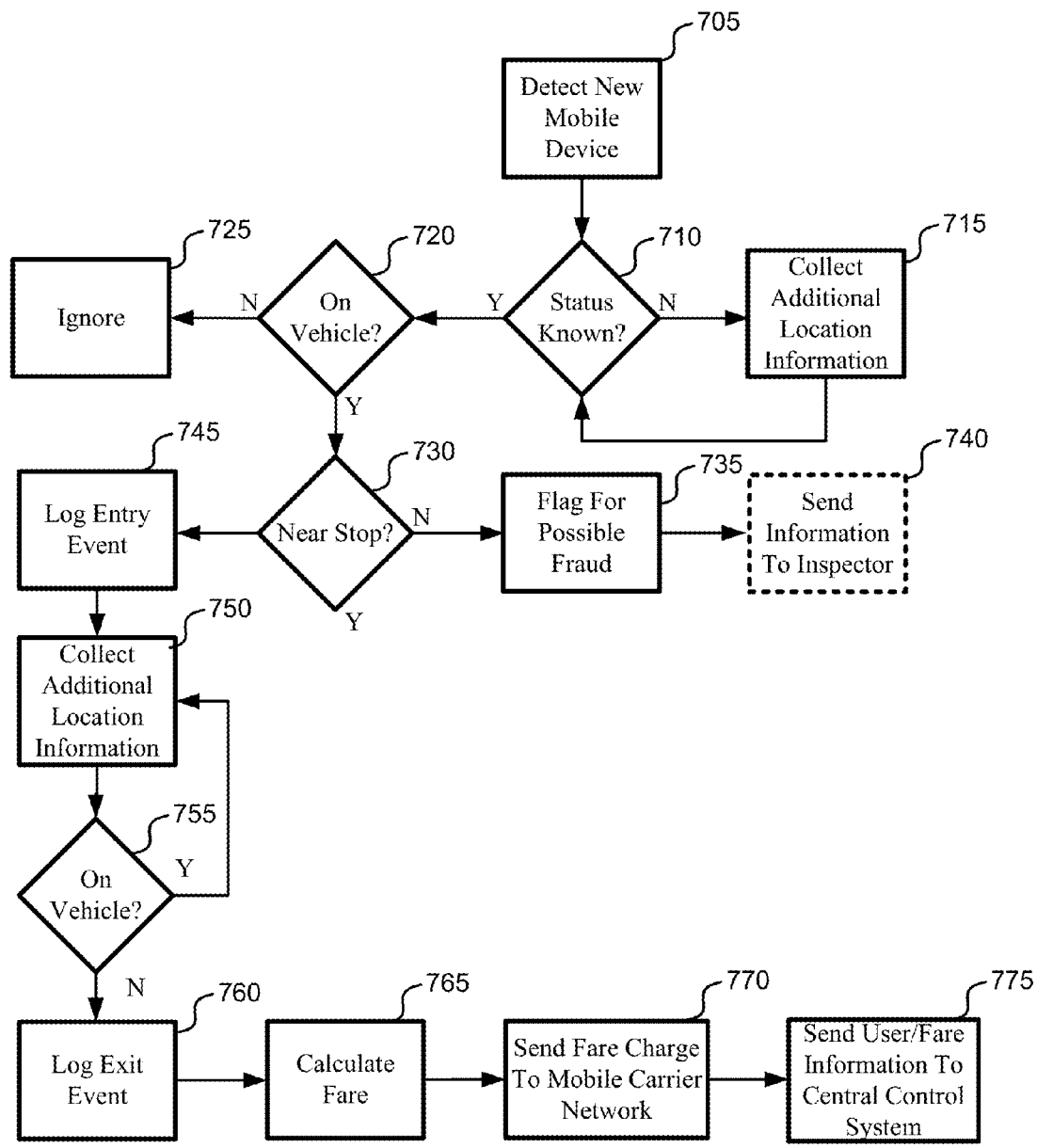
FIG. 7A is flow chart of a method for determining a mobile device is on a transit vehicle and calculating a corresponding fare, according to some embodiments.

FIG. 7A is flow chart of a method for determining a mobile device is on a transit vehicle and calculating a corresponding fare, according to some embodiments. The method can be performed by one or more systems. Some or all of these systems, such as the transit vehicle computer 320, can be located on the transit vehicle 310.

The method can begin at block 705 by detecting a new mobile device not previously detected. This can occur, for example, when a transit vehicle computer 310 detects signal transmitted by a mobile device 250 the transit vehicle computer 310 has not recently detected within a corresponding wireless detection zone 340.

At block 710, a determination is made as to whether the status is known. If the status is not known, the method can move to block 715, where additional location information is collected. It will be noted that additional location information can include information from a variety of sources, as indicated above. The method can include actively interrogating the detected mobile device 250 for GPS, accelerometer, and/or other information. Additionally or alternatively, collecting additional location information can include simply waiting to see whether the mobile device 250 is detected a second time.

At block 720, the method can then include determining whether the detected mobile device 250 is on the transit vehicle 310. If it is determined that the mobile device is not on the transit vehicle 310, the mobile device can be ignored, at block 725. If the mobile device is determined to be on the vehicle, an additional determination can be made at block 730 regarding whether the transit vehicle 310 is near a transit stop. If the transit vehicle is not near a transit stop, yet the mobile device 250 is determined to be on the transit vehicle 310, it can be an indicator that the mobile device 250 was turned on (or its wireless functionality activated) after a transit user entered the transit vehicle 310. Because this can be an indicator of fraud, the unique identifier corresponding to the mobile device 250 can be flagged for possible fraud at block 735. Moreover, information regarding the fraud can be sent to a fare inspector, at block 740. This can include sending the information regarding the possible fraud to a fare inspector device 330.

On the other hand, if the detection of the new mobile device 250 occurred near a transit stop, it may be presumed that the detection is associated with a transit user's boarding of the transit vehicle 310. At block 745, an entry event associated with the mobile device 250 can be logged, and at blocks 750 and 755, additional location information can be collected (block 750) while it is determined that the mobile device 250 is still on the transit vehicle (block 755). At block 760, if it is determined that the mobile device has exited the vehicle, an exit event is logged. It will be understood that, as with an entry, if the exit does not correlate with a designated stop of the transit vehicle 310, the mobile device may be flagged for possible fraud. Because the mobile device 250 is likely no longer on the transit vehicle 310, however, there may not be a need to inform a fare inspector. Rather, the information may be sent to a central system, such as the central control system 110, for further fraud detection and/or prevention measures.

At block 765, a fare is calculated. The fare may be calculated using fare rate tables, combined with the entry and exit events, which, when combined with GPS and/or other location information, indicate locations at which a transit user having a mobile device 250 boarded and exited the transit vehicle 310. Other information relevant to fee calculation, such as date, time, and/or user information also may be used.

At block 770, fare information is sent to a mobile carrier network 170, according to this embodiment. Mobile devices using telephony connections to communicate wirelessly, such as GSM, are associated with a mobile carrier network 170. This mobile carrier network 170 can be determined from the data transmitted from the mobile device 250. A transit service provider can also establish a relationship with the mobile carrier network 170 such that the mobile carrier network 170 can receive fare charge information from the transit service provider's transit system 100 (which can be sent from, for example, a central control system 110 and/or directly from a transit vehicle computer 320 via WAN interface 440). The mobile carrier network 170 can bill the transit user associated with the mobile device 250, and can later settle the payment with the transit service provider. This functionality therefore allows a person to, for example, ride a transit vehicle 310 using nothing other than the person's mobile phone as proof of payment, and pay for the transit rides on a phone bill associated with the mobile phone. As detailed herein, fare can be calculated by a central system according to certain embodiments. It will be understood that, in these embodiments, blocks 765 and 770 can be carried out by the central system. Moreover, it will be further understood that embodiments described herein can be carried out by a number of different devices and/or systems.

Finally, at block 775, user/fare information can be sent to a central system, such as the central control system 110. This information can include any information gathered and used to calculate a fare, as well as any other information required by the transit system 100. As indicated above, a mobile device 250 may be identified by a unique identifier. This unique identifier can be used by the central system to associate the ride with a user account. The information additionally may be used by the central system for auditing and reporting requirements.

Figure 7B:
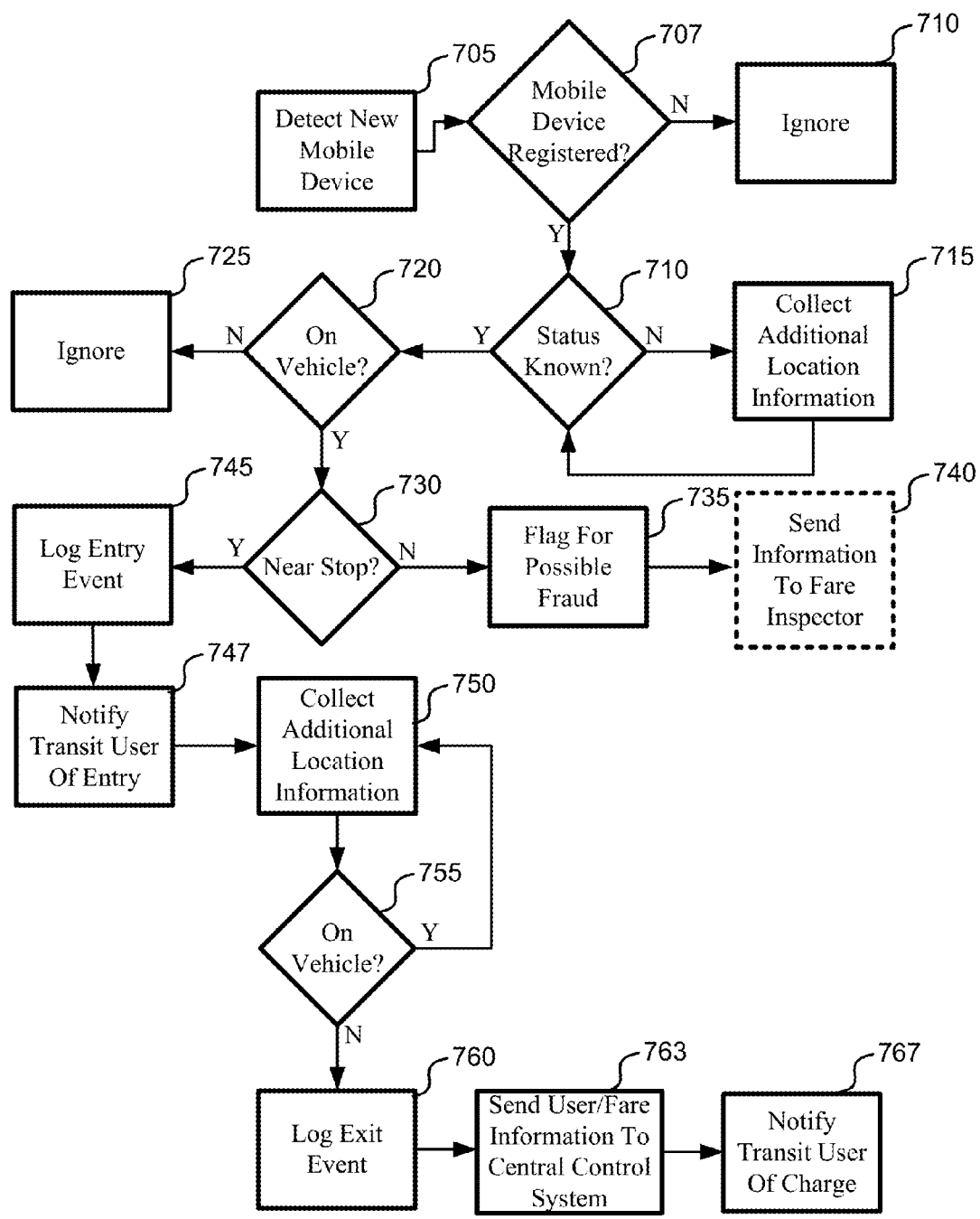
FIG. 7B is flow chart of an alternative method for determining a mobile device is on a transit vehicle and calculating a corresponding fare, according to some embodiments.

FIG. 7B is flow chart of an alternative embodiment of a method for determining a mobile device is on a transit vehicle. Similar to the embodiment shown in FIG. 7A, the embodiment illustrated in FIG. 7B shows how the determination may be made automatically with little or no input from the transit user. However, the embodiment shown in FIG. 7B illustrates how a mobile device 250 can be registered for this service. For example, at block 707, it is determined whether the mobile device 250 is registered. If not, at block 710, the mobile device is ignored. This demonstrates an "opt-in" type functionality; according to this embodiment, mobile devices 250 will not be used to pay for transit fares or for proof of payment unless a transit user registers the mobile device 250 beforehand.

A database of registered mobile devices may be consulted to determine whether the device is registered. The database can be located on a central data store 114, a station data store 216, memory 450 of a transit vehicle computer 320, or even by a third party. It will be understood that a transit user can register a mobile device 250 in any of a variety of ways. It may be done, for example, in person at a TVM 212 or a ticket booth 220, where a the unique identifier of the mobile device 250 may be determined directly from the mobile device. Additionally or alternatively, a transit user may call a customer service center 190 and/or the mobile carrier network 170, where the unique identifier of the mobile device 250 would be provided by means other than direct communication by the mobile device 250.

FIG. 7B also demonstrates how, at block 747, a user may be notified of an entry event. Such notification may be made via text, email, automated phone call, through an application on the mobile device 250, and/or other methods. Similarly, at block 467, a transit user can be notified of the fare charge after an exit event is logged. In this embodiment, however, the user/fare information is sent to a central control system 110, at block 763, for fare calculation and other processing. Thus, this embodiment illustrates how a fare may be calculated by a central system. In fact, the central system may send the transit user notification of the fare charge. It will be understood, however, that various embodiments are contemplated, which include any combination of local and/or central systems to conduct fare processing and/or notification.

Figure 8:
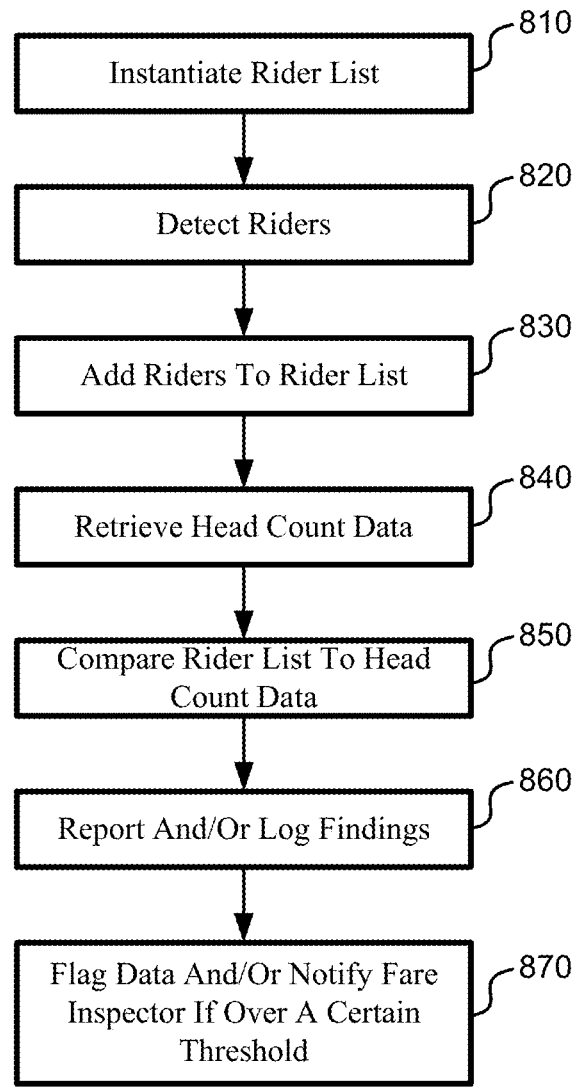
FIG. 8 is a simplified diagram for inventorying passengers on a transit vehicle and detecting possible fraud, according to some embodiments.

FIG. 8 is a simplified diagram for inventorying passengers on a transit vehicle and detecting possible fraud, according to some embodiments. It can begin at block 810, by instantiating a rider list, and, at block 820, detecting riders. As detailed herein, a mobile device 250 can be detected by, for example, a transit vehicle computer 320, to indicate that a transit user is riding the transit vehicle 310. As such, the transit user becomes a rider, and, at block 830, can be added to a rider list. The list can include, for example, the unique identifiers for detected mobile devices 250 determined to be riding the transit vehicle 310.

At block 840, head count data is received. As explained above, a transit vehicle computer 320 can include and/or be coupled with an APC 420. The APC can utilize optical, pressure, and/or other data to provide a head count of riders of the transit vehicle 310. At block 850, the rider list can be compared with the head count of riders. This information can be logged and/or reported at block 860. If a discrepancy between the rider list and the head count exceeds a certain threshold, the data can be flagged and/or a fare inspector can be notified, as shown in block 870. Although the use of mobile devices 250 to pay for a fare related to a ride on a transit vehicle 250 may not be the only method of payment for a fare, if it becomes a primary means to do so among transit users, a discrepancy between riders detected and a total head count (provided by, for example, and APC 420) can indicate that some riders may not be paying for their fare. A transit vehicle computer 320 and/or a central control system 110, for example, can indicate to a fare inspector who may or may not be on the transit vehicle 310 of this potential fraud. The notification to the fare inspector can be, for example, received by a fare inspector device 330.

Figure 9A:
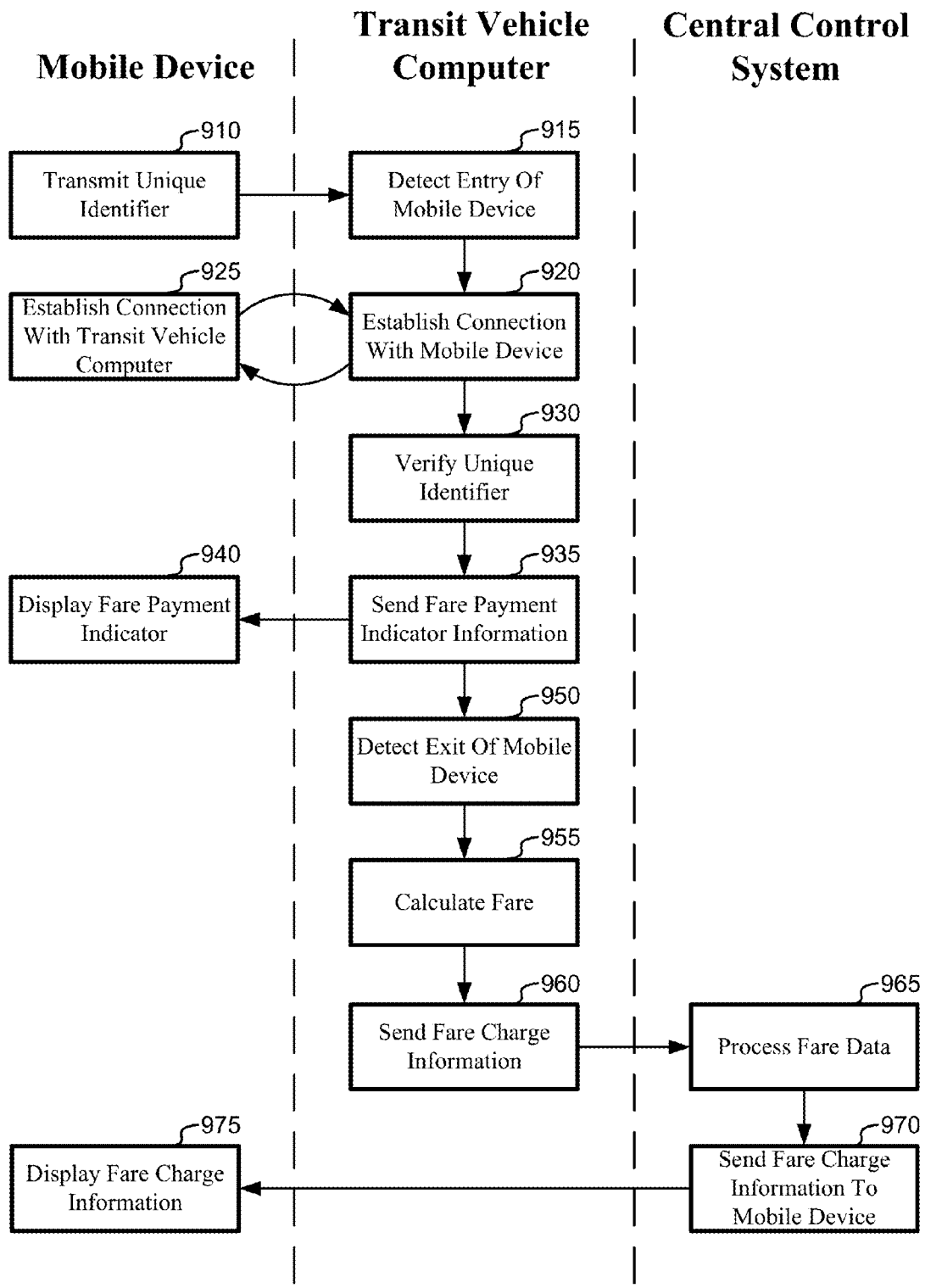
FIG. 9A is swim-lane diagram illustrating an embodiment of how a mobile device, transit vehicle computer, and central control system can interact to provide wireless fare payment.
Figure 9B:
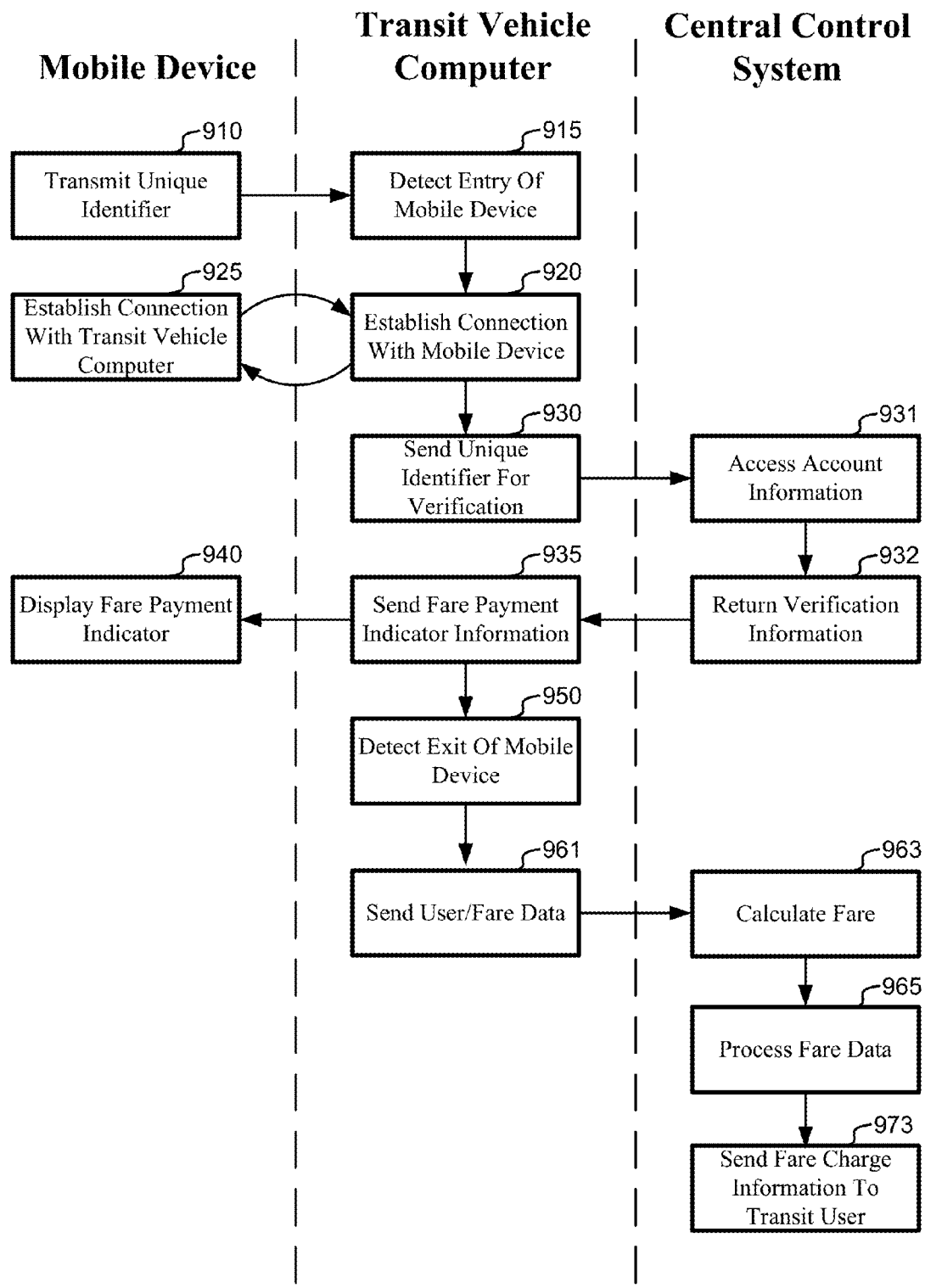
FIG. 9B is swim-lane diagram illustrating an alternative embodiment of how a mobile device, transit vehicle computer, and central control system can interact to provide wireless fare payment.
Figure 9C:
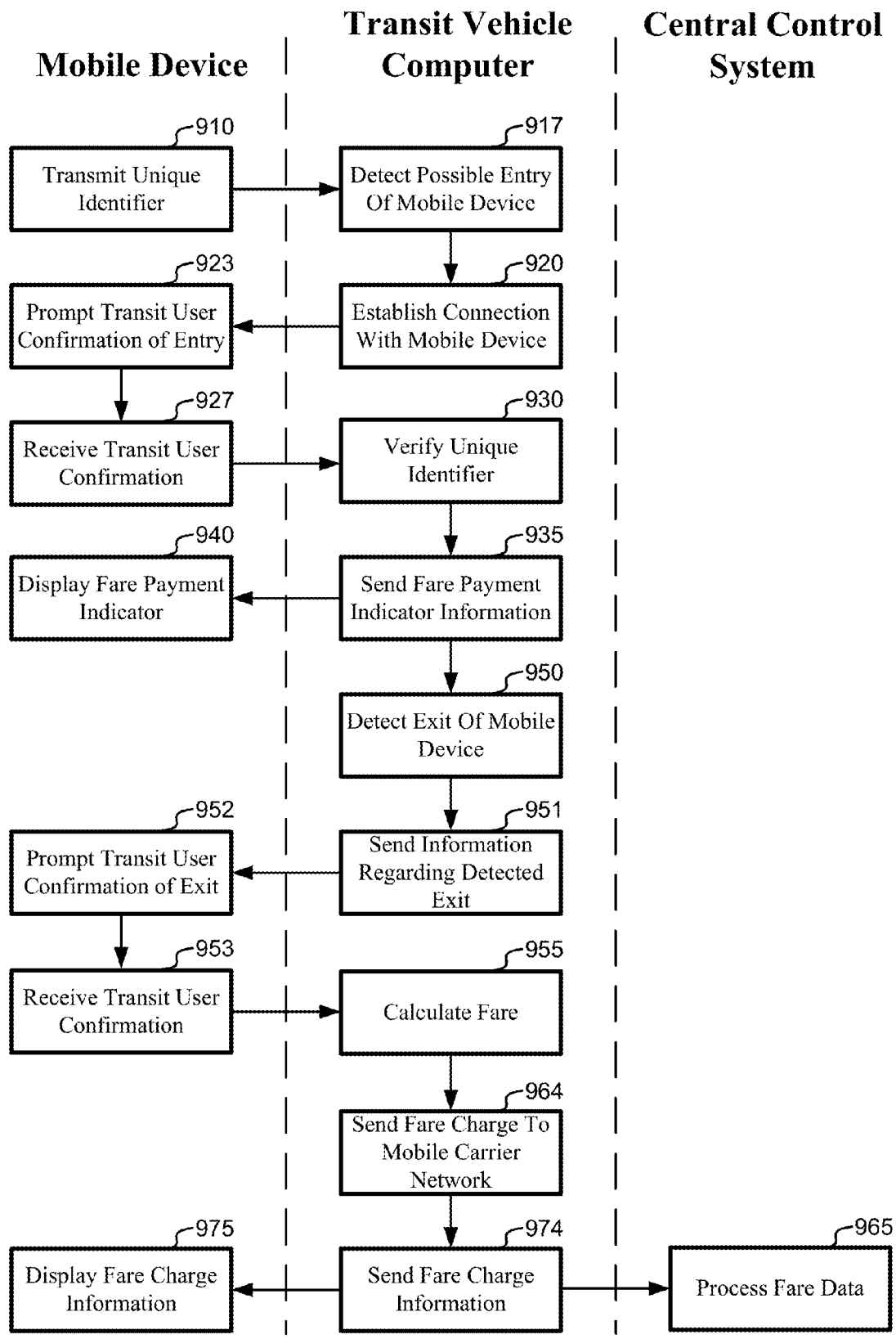
FIG. 9C is swim-lane diagram illustrating yet another embodiment how a mobile device, transit vehicle computer, and central control system can interact to provide wireless fare payment.

FIGS. 9A-9C are swim-lane diagrams illustrating embodiments of how a mobile device 250, transit vehicle computer 320, and central control system 110 can interact to provide wireless fare payment, as well as provide proof of payment. These embodiments illustrate how a mobile device 250 can execute a transit application that enables the mobile device 250 to interact with, for example, a transit vehicle computer 320. Such a transit application can be executed by, for example, smart phones, tablet computers, gaming devices, and more. As shown in FIG. 1, a transit application source 120 can provide a transit application to a mobile device 250 via mobile carrier network 170 and/or the Internet (WAN 140). The transit application can also allow the mobile device 250 to interact directly with the transit system 100 through, for example, the Internet. This can enable the transit application to register the mobile device 250 with the transit system 100 so that it may be used to pay fares and/or show proof of payment on the transit vehicle 310. Additionally or alternatively, the transit application can allow the transit user to create a transit user account, as detailed above.

Referring now to FIG. 9A, a mobile device 250 can transmit a unique mobile device identifier, at block 910. Although a mobile device 250, such as a mobile phone, can transmit identification information without an transit application, a transit application can be used to transmit any additional information as desired or needed by the transit vehicle computer 320. Moreover, a transit application can utilize GPS data, proximity information, and/or other information from the mobile device 250 to determine that the mobile device 250 is near a transit vehicle computer 915, thereby allowing the mobile device 250 to transmit information for use by the transit vehicle computer 320 as it approaches the transit vehicle 310. This transmission can be used at block 915 to detect entry of the mobile device 250 onto the transit vehicle 310.

At blocks 920 and 925, the transit vehicle computer 320 and mobile device 250 establish a connection. This connection can enable transit vehicle computer 320 and mobile device 250 to communicate data using a secure wireless connection. This connection can provide a higher level of security, but may not be necessary in alternative embodiments. At block 930, the transit vehicle computer can verify the unique identifier of the mobile device 250, for example, to ensure that the unique identifier has not been blacklisted in the transit system 100.

At block 935, the transit vehicle computer 320 can send fare payment indicator information to the mobile device, as discussed above. Accordingly, at block 940, the fare payment indicator 620 may be displayed by the mobile device 250.

At block 950, after a transit user with the mobile device 250 exits the transit vehicle 310, the transit vehicle computer 320 can detect the exit of the mobile device 250. At block 955, the transit vehicle computer 310 can calculate a fare, and, at block 960, send the fare charge information to the central control system 110. If the transit vehicle computer 320 still is communicatively linked with the mobile device 250, the transit vehicle computer can send an indication that it has detected the mobile device is no longer on the transit vehicle 310, and the transit device can remove the fare payment indicator 620 from the display 610 of the mobile device 250.

After receiving the fare charge information, the central control system can, at block 965, process the fare data. As discussed herein, this can include generating required accounting and/or reporting information, among other things. Processing can also include deducting the fare charge from a product and/or financial account associated with the mobile device 250. For instance, the transit user may have a transit user account with a running balance associated with a transit product. Alternatively, the transit user account may simply include financial information (e.g., a funding source 165 connected to the transit system 100 though a financial network 150, as shown in FIG. 1), wherein the financial information is used by the transit system 100 for payment of the transit fare.

At block 970, fare charge information may be sent to the mobile device 250. Depending on the functionality of the transit system 100, this may include an indication that a funding source has successfully been debited the fare amount. At block 975, the fare charge information is received and displayed by the mobile device 250, indicating the fare charge and/or payment to the transit user.

FIG. 9B illustrates an alternative embodiment of how a mobile device 250, transit vehicle computer 320, and central control system 110 can interact to provide wireless fare payment and proof of payment. In this embodiment the central control system 110 can be utilized in verifying the unique identifier by accessing account information at block 931 and returning verification information at block 932. Accessing account information can include, for example, accessing a transit user account associated with the unique identifier of the mobile device 250. In addition, or as an alternative, to checking any blacklists, accessing a transit user account can allow the central control system 110 to access related funds and/or transit product information. If the unique identifier of the mobile device 250 is blacklisted, or if a transit user account associated with the unique identifier has inadequate funds to pay for a fare, this information can be relayed to the transit vehicle computer 320, which can determine not to send fare payment indicator information to the mobile device 250.

If funds of a transit user account associated with the unique identifier are inadequate to pay a fare, the mobile device 250 may be used to provide additional payment information. The central control system 110 and/or transit vehicle computer can send a request to the mobile device 150 for payment information, via text, automated phone call, email, or other method, including sending information to a transit application executed on the mobile device 250, prompting the transit user to enter payment information. In this latter case, the transit application can enable a transit user to enter payment information directly into the mobile device 250, even while the mobile device 250 is on the transit vehicle 310. Payment information can be entered using one or more user input interfaces of the mobile device 250, such as a touch screen, keyboard, keypad, etc. This payment information can be sent to the transit vehicle computer 320 and/or relayed to a central control system 110, which can conduct a transaction with an outside entity, such as a financial institution 160, for payment of the fare and/or a transit product. Once the payment is determined to cover the fare, the central control system 110 and/or transit vehicle computer 320 can send fare payment indicator information to the mobile device 250, allowing the mobile device to display the fare payment indicator as proof of payment.

This embodiment also demonstrates how the central control system 110 can be used to calculate a fare. For example, at block 961, the transit vehicle computer 320 can send user/fare data to the central control system 110. And at block 963, the fare is calculated by the central control system 110.

Additionally, this embodiment illustrates how fare charge information can be sent to the transit user, but without utilizing the mobile phone 250. For instance, at block 973, the central control system 110 can send fare charge information to the transit user. This can be, among other things, via email, phone call, mail, etc. Of course, information additionally may be sent to the mobile device 250, such as a text, automated phone call, email, etc. It will be understood that numerous variations are contemplated.

FIG. 9C illustrates yet another alternative embodiment of how a mobile device 250, transit vehicle computer 320, and central control system 110 can interact to provide wireless fare payment and proof of payment. This embodiment illustrates how interaction between the mobile device 250 and transit vehicle computer 320 can be increased while communication to the central control system 110 can be limited.

For example, rather than establishing a connection with the mobile device 250 after determining the mobile device 250 is on the transit vehicle 310, the transit vehicle computer 320 can, at block 917, detect possible entry of the mobile device 250, and, at block 920, establish a connection with the mobile device 250. For example, the transit vehicle computer 320 can establish a connection with the mobile device 250 once the mobile device 250 enters the corresponding wireless detection zone 340. The mobile device 250 can then, at block 923, prompt the transit user to confirm whether the transit user has boarded (or will board) the transit vehicle 310. At block 927, the mobile device can receive the transit user confirmation, and relay it back to the transit vehicle computer 320.

Security feature could be introduced when requesting confirmation at block 923. For example, the mobile device 250 could further prompt a transit user to enter security information such as a password, code, etc. previously chosen by the transit user. The security information could be stored on the mobile device itself and/or verified by the transit vehicle computer 320 and/or central control system 110. This simple security feature could help prevent the use of the mobile device 250 to pay for transit fares of an unauthorized user. Furthermore, the mobile device can be configured to transmit time, location, and/or other information to the transit vehicle computer 320 and/or central control system 110 if incorrect security information is entered. This could help locate the mobile device 250, if stolen.

Similarly, at block 951, if the mobile device 250 is still in communication with the transit vehicle computer 320 after a detected exit, the transit vehicle computer 320 can send information to the mobile device 320 regarding the detected exit. And, at blocks 952 and 953, the mobile device 250 can prompt the transit user for confirmation of the exit and receive the confirmation.

According to this embodiment, at block 964, the transit vehicle computer 320 can send a fare charge to the mobile carrier network 170 corresponding to the mobile device 250. As described above, this can provide for the fare charge to be included on, for example, a phone bill provided by the mobile carrier network 170. At block 974, the transit vehicle computer 320 can further send fare charge information to the mobile device 250 and central control system 110.

Figure 10A:
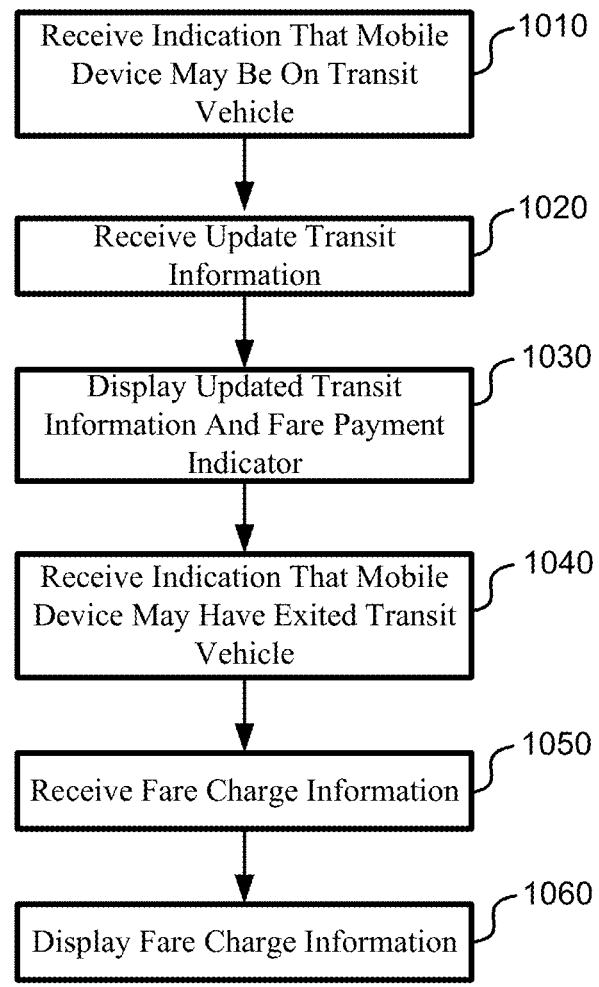
FIG. 10A is diagram illustrating the functionality of a transit application executed by a mobile device, according to one embodiment.

FIG. 10A is diagram illustrating the functionality of a transit application executed by a mobile device 250, according to one embodiment. As discussed above, a transit application may be provided by the transit system 100 or another source, and downloaded to a mobile device 250 via the Internet. The transit application can provide additional information and functionality to a transit user using the mobile device 250 executing the transit application.

This embodiment illustrates basic functionality of the transit application while the mobile device 250 is on a transit vehicle 310. At block 1010, for instance, the application can receive an indication that the mobile device 250 may be on a transit vehicle 310. The indication can be a result of receiving information from a corresponding transit vehicle computer 310, suggesting the mobile device 250 has entered a wireless detection zone 340.

The transit application can additionally enable the mobile device 250 to display information transmitted by the transit vehicle computer 320, providing additional functionality and features to the transit user. At block 1020, for example, the transit application can receive updated transit information, and, at block 1030, display the updated transit information. Examples of information the transit application can cause the mobile device 250 to display can include the fare payment indicator for inspection; updated fare information (e.g., an updated fare amount for the transit user's current ride on the transit vehicle 310); advertisements, information, and/or coupons from local businesses; historical, geographical, and/or other information relating to the transit vehicle's current location; the names and/or addresses of upcoming and/or previous transit vehicle stops; and more.

The transit application, at block 1040, can receive an indication that the mobile device may have exited the transit vehicle 310. This indication can be sent, for example, by the transit vehicle computer 320, or it may be based on an interruption in the communication with the transit vehicle computer 320 caused by, for example, the mobile device 250 having left the wireless detection zone 340.

At block 1050 the transit application can receive fare charge information. And at block 1060, the transit application can display fare charge information on the display of the mobile device 250. As discussed above, the fare charge information may be sent by the transit vehicle computer 250 or by a central system, such as the central control system 110.

Figure 10B:
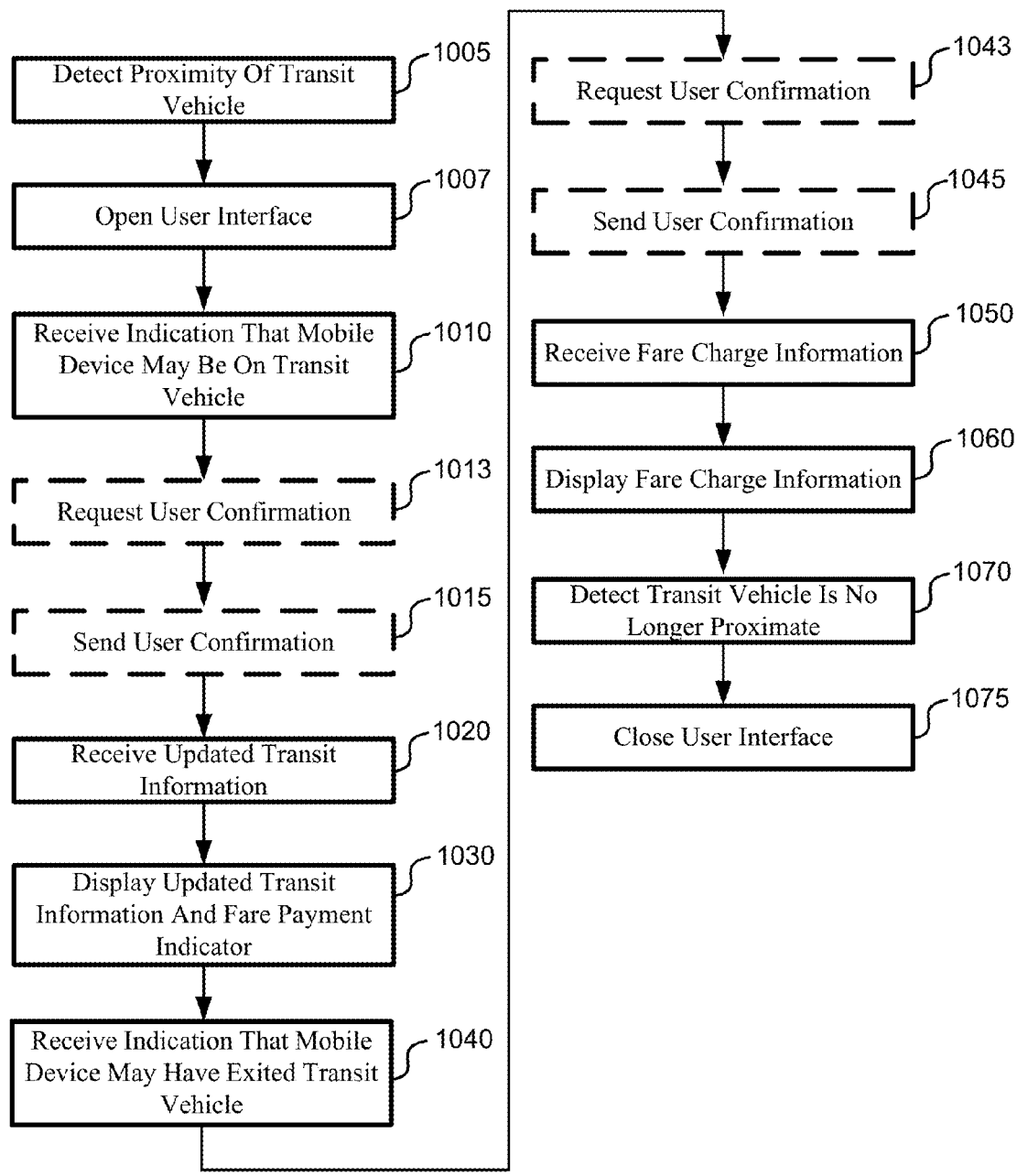
FIG. 10B is diagram illustrating the functionality of a transit application executed by a mobile device, according to an alternative embodiment.

FIG. 10B is diagram illustrating the functionality of a mobile device application, according to an alternative embodiment. This embodiment illustrates additional functionality that a transit application can provide, relating to a transit user's ride on a transit vehicle 310.

At block 1005, for instance, the transit application can detect the proximity of a transit vehicle 310. Additionally or alternatively, it may detect the proximity of a transit station, a designated transit stop, or other "active transit area," as determined by the transit services provider, and/or the transit user. Proximity may be determined based on location data, such as GPS data. It may also be determined by one or more proximity sensors 470, such real-time locating systems (RTLS) as discussed above. Having determined the proximity of an active transit area, the transit application can, at block 1007, open a user interface, displaying, for example, information provided by a nearby transit system, such as a transit vehicle computer 320 and/or a station server 224.

As with the embodiment of FIG. 10A, at block 1010, the transit application can receive and display an indication that the mobile device 250 may be on the transit vehicle. Additionally, however, as discussed in other embodiments herein, the transit application can receive transit user input to assist in determining whether the transit user is on the transit vehicle 310. The steps depicted at blocks 1013, 1015, 1043, and 1045, indicate how the transit application may optionally request and send user confirmation of entering and/or exiting the transit vehicle 310.

Mirroring block 1005, the transit application can detect that the transit vehicle 310 or other active transit area is no longer proximate and can, at block 1075, close the user interface. It can optionally indicate to the transit user that an active transit area is no longer proximate and ask whether the transit wishes to close the user interface. Upon receiving an indication that the user desires to close the user interface, the interface can then be closed.

Figure 11:
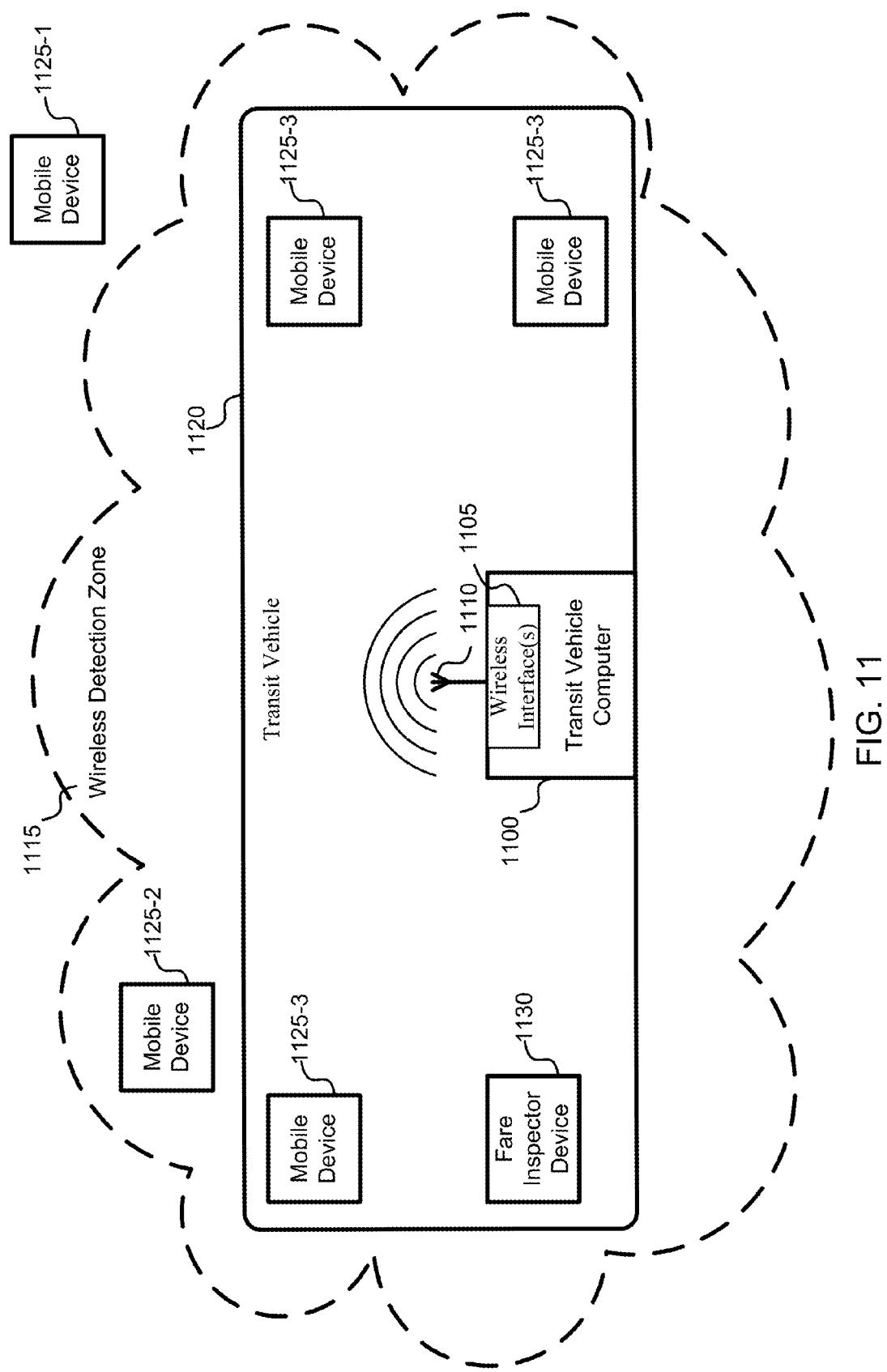
FIG. 11 is a simplified block illustration of a transit vehicle with a wireless detection zone, according to certain embodiments.

FIG. 11 illustrates a simplified block illustration of a transit vehicle 1120 with a wireless detection zone 1115, according to certain embodiments. Transit vehicle 1120 may be similar to transit vehicle 310 described above and can include, for example, a bus, light-rail car, commuter-rail car, trolley, and/or similar such vehicles. The transit vehicle 1120 and its components may be used in the processes described herein for detecting mobile devices and facilitating fare payment, fraud detection, and the like. As discussed above, a transit vehicle computer 1120 can serve as a fare collection point by collecting fare information wirelessly from mobile devices 1125. For instance, a transit vehicle computer 1100 can include one or more wireless interfaces 1105, each of which can use at least one antenna 1110 to detect signals, such as RF signals, Bluetooth™ Low Energy signals, and/or other wireless communications signals from mobile devices 1125 inside a wireless detection zone 1115 encompassing the transit vehicle 310. As suggested above, the wireless interfaces can employ one or more wireless technologies, such as any of the IEEE 802.11 wireless standards, Bluetooth®, ZigBee®, Global System for Mobile communications (GSM) and/or other mobile telephony standards, and more. It will be understood that concepts conveyed in FIG. 11 can be applied to aspects of a transit and/or transportation system, extending the concept of a wireless detection zone 1115 to applications besides transit vehicles 1120. For example, detection zones may be located at other "active areas" of a transit and/or transportation system.

Detection of a passenger can be performed in a variety of ways and may vary depending on the functionality of the transit vehicle computer 1100. Mobile devices 1125, such as cell phones, typically transmit wireless signals to, for example, exchange information with a cell in a mobile telephony network and/or detect and connect with a local area or other network. This enables the transit vehicle computer 1100 to detect mobile devices 1125 within an operating range of antenna 1110, which may define the wireless detection zone 1115.

Although the wireless detection zone 1115 shown in the embodiment of FIG. 11 extends beyond the outer or physical boundaries of the transit vehicle 1120, the boundaries of the wireless detection zone 1115 may vary depending on functionality, cost, type or wireless protocol used by antenna 1110, and other considerations. The wireless detection zone 1110 may include, for example, only a portion of the transit vehicle 1120. In other embodiments, the wireless detection zone 1115 may include the exact or approximate boundaries of the transit vehicle 1120. Establishing the boundaries of the wireless detection zone 1115 can include methods such as using software and/or hardware functionality of the transit vehicle computer 1100 (and/or wireless interface(s) 1105) to determine a distance of a mobile device 1125 to the antenna 1110, using dedicated hardware proximity sensors coupled with the mobile devices 1125 and transit vehicle 1120, and/or utilizing multiple antennas communicatively coupled with the transit vehicle computer 1100 to triangulate the position of a mobile device 1125 relative to the transit vehicle 1120. In other embodiments, materials used in and/or coupled to the body of the transit vehicle 1120 may be used to constrain the wireless signal within the outer or physical boundaries of the transit vehicle 1120 such that the wireless detection zone 1115 extends to the exact or approximate boundaries of the transit vehicle 1120. The transit vehicle computer 1100 can use the information transmitted by the mobile device 1125 to determine a unique identifier for each mobile device 1125, as discussed above. Thus, the transit vehicle computer 1100 can track multiple mobile devices 1125 in the wireless detection zone 1115 individually.

Other information sources can be used to help determine the position of a mobile device 1125 relative to the transit vehicle, as discussed below. However, the distance of the mobile device 1125 as determined by a transit vehicle computer 1100 coupled with a single antenna 1110, along with current location information, often can be enough to provide an accurate determination of whether a mobile device 1125 is on a transit vehicle 1120. To improve accuracy, the transit vehicle computer 1100 can poll the wireless detection zone 1115 a plurality of times while the transit vehicle 1120 is at a plurality of locations. As used herein, the term "poll" can include both actively interrogating wireless devices for communication and passively "listening" for wireless communication.

User devices, including the mobile devices 1125 described herein, may be provided with a mobile application. This mobile application may be provided by the transit system and may be downloaded and installed on the mobile device 1125. Once installed, a user may use the mobile application running on the mobile device 1125 to check into a transit vehicle 1120. For example, a user may select a transit vehicle 1120, such as a bus on a particular route, from a list of available transit vehicles on the application. In some embodiments, the list may be populated with transit vehicles based on the location of the mobile device 1125. For example, the application may access location information, such as from a GPS sensor in the mobile device 1125, to determine which transit vehicles may be accessible near the particular location. In other embodiments, the application may cause the mobile device 1125 to communicate with a beacon or other device positioned near a transit stop to determine the location of the mobile device 1125. The beacon may communicate a signal to the mobile device 1125 that includes an identifier of the transit stop.

In other embodiments, the mobile application may detect a beacon or other device that is coupled with the transit vehicle 1120. For example, the wireless detection zone 1115 may extend beyond a transit vehicle 1120 such that a mobile device 1125 may detect when the transit vehicle 1120 is nearby. The wireless detection zone 1115 may provide an identifier of the transit vehicle 1120 such that the mobile device 1125 may identify which transit vehicle is nearby. In other embodiments, the transit vehicle 1120 may have a separate beacon or signal device that provides an identifier of the transit vehicle 1120 to the mobile device 1125. Upon identification of the transit vehicle, the application may prompt a user to check into the identified transit vehicle, rather than selecting the transit vehicle 1120 from a list.

To check in, a user may actively select a transit vehicle 1120 from a display of the mobile device 1125. This may be done by selecting the transit vehicle 1120 from a list or by selecting a nearby transit vehicle 1120 as described above. In other embodiments, upon the user opening the application, the application may automatically check the mobile device 1125 into a nearby transit vehicle 1120 and/or a transit vehicle 1120 having a wireless detection zone 1115 within which the mobile device 1125 is detected.

While a user actively checking is often accurate in ensuring proper fare calculation, there may be times when a user inadvertently checks into a transit vehicle 1120 and/or checks into an incorrect transit vehicle. To prevent this from affecting fare calculation, additional information may be used to verify a mobile device 1125 is actually on a transit vehicle 1120. Additionally, this information may be used to detect users who have not checked in at all, which may be an indication of fraud and/or mistake.

Using the embodiment shown in FIG. 11 as an example, mobile devices 1125-2 along with mobile device 1125-3 are within the boundaries of the wireless detection zone 1115, so the transit vehicle computer 1100 can make a determination that these devices may be associated with transit users who have boarded the transit vehicle 1120. If one of mobile device 1125-2 or 1125-3 has not checked in, or checks in between transit stops, a late arriving indication may be provided to the offending mobile device such that upon visual inspection by a fare inspector, the fare inspector may know that the mobile device was checked in late or not at all, which may indicate fraud. Additionally, a late arriving indication may be communicated to a fare inspector device 1130. This indication may include an identifier of the offending mobile device and/or information identifying a user of the mobile device, such as the user's name, picture, and the like. Because mobile device 1125-1 is outside the wireless detection zone 1115, it will not be considered by the transit vehicle computer 1120. After the transit vehicle 1120 moves to a different location, such as on the route to another stop, the transit vehicle computer 1120 can poll the wireless detection zone 1115 again to determine which mobile devices 1125 are located therein. Because mobile device 1125-1 was located outside the transit vehicle 1120 initially, it most likely will no longer be within the boundaries of the wireless detection zone 1115. The transit vehicle computer 1100 will determine that mobile device 1125-1 was never on the transit vehicle 1120, and therefore should not be charged a fare.

Polling of the wireless detection zone 1115 by the transit vehicle computer 1100 not only can determine which mobile devices 1125 are on the transit vehicle 1120, but when the transit users carrying the mobile devices 1125 board and exit the transit vehicle. For instance, the transit vehicle computer 1100 can determine a transit user has boarded the transit vehicle 1120 at a first designated stop of the transit vehicle 1120 by receiving a check in indication and/or detecting an associated mobile device 1120 at the first designated stop and verifying, at one or more locations along the transit vehicle's route, that the mobile device 1125 is still within the boundaries of the wireless detection zone 1115. The transit vehicle computer 1100 can, for example, log a check in and/or an entry event associated with the mobile device 1125. If the transit vehicle computer 1120 no longer detects the mobile device 1125 after a second designated stop of the transit vehicle, the transit vehicle computer 1100 can determine that the transit user associated with the mobile device 1125 has exited the transit vehicle. The transit vehicle computer can then log an exit event associated with the mobile device 1125. With both entry and exit events, the transit vehicle computer 1125 can determine an associated fare or transmit the information for fare calculation. The transit vehicle computer 1100 can also store and/or transmit related information for processing and/or reporting requirements, such as vehicle number, date, time, location, direction, and more.

Figure 12A:
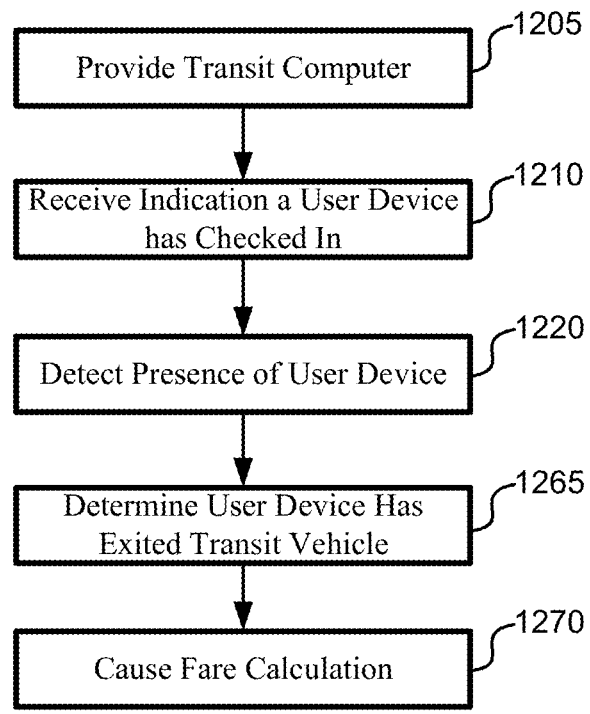
FIG. 12A is flow chart of a method for enabling automatic fare calculation in a transit system, according to some embodiments.

FIG. 12A is flow chart of a method for enabling automatic fare calculation, according to some embodiments. The method can be performed by one or more systems. Some or all of these systems, such as the transit vehicle computers 320 and/or 1100, can be located on the transit vehicles 310 and/or 1120.

The method can begin at block 1205 by providing a transit computer on a moving transit vehicle. The transit computer may include a wireless detection zone that includes a wireless interface, such as a Bluetooth™ and/or other wireless interface. The wireless detection zone may be configured to extend at least to a physical boundary of the transit vehicle, however other wireless detection zones may be implemented. At block 1210, an indication that a first user device or mobile device has checked into the transit vehicle at a first location may be received. The first location may be a transit stop along a route of the transit vehicle. The indication may include the first location, as well as an identifier of the first user device. To verify that the first mobile device is actually on the transit vehicle, the first mobile device may be detected using the wireless interface. For example, the transit vehicle computer may periodically poll the first user device during transit, such as from the first location to a second location, at block 1220. At block 1265, the transit vehicle computer may determine that the first user device has exited the transit vehicle. This may be done by determining when the first user device is no longer detected within the wireless detection zone, such as during the periodic polling. Oftentimes, the determination may be made at or near the second location, such as at a subsequent transit stop. At block 1270, the transit vehicle computer may cause a fare to be calculated for the user of the first user device. The fare may be based on the user as identified by the identifier of the first user device, the first location, the second location, a type of account and/or fare linked to the account associated with the identifier of the first user device, whether the user device transferred to another line of the transit system, and/or other information relevant to fare calculation. In some embodiments, causing a fare to be calculated includes communicating a message to a transit server such that the fare may be calculated by the server. The message may include the identifier of the first user device, the first location, and/or the second location. In other embodiments, the transit vehicle computer may user the identifier of the first user device, the first location, the second location, and/or other information to calculate the fare.

Figure 12B:
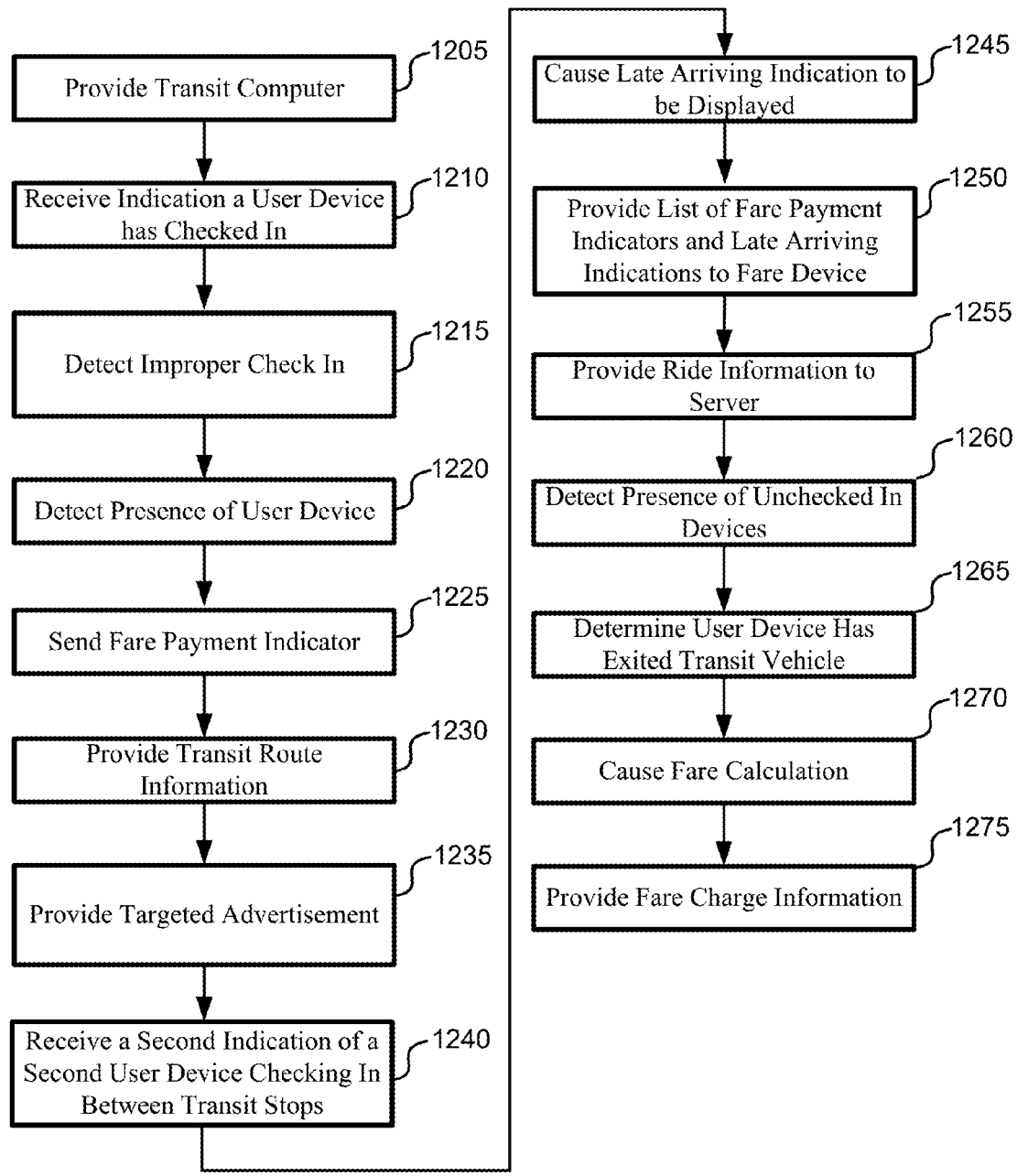
FIG. 12B is flow chart of an alternative method for enabling automatic fare calculation in a transit system, according to some embodiments.

FIG. 12B is a flowchart of a method for enabling automatic fare calculation, according to an alternative embodiment. This embodiment illustrates additional functionality that a transit application can provide, relating to a transit user's ride on a transit vehicle.

As with the embodiment of FIG. 12A, at block 1205, a transit computer may be provided on a moving transit vehicle. An indication that a first user device has checked in may be received at block 1210. At block 1215, an improper check in may be detected. For example, a user may select a transit vehicle that is not near the user device. As another example, where two or more transit vehicles are nearby, the mobile application of the user device may detect multiple transit vehicles. The user and/or user device may check into a transit vehicle that the user does not board. If the wireless detection zone of a transit vehicle computer detects, at any time, the presence of a user device that is checked into a different transit vehicle and/or transit vehicle computer, the transit vehicle computer may flag the user as improperly checked in. This may result in a notification being sent and displayed on the user device and/or on a fare inspector device.

At block 1220, the presence of the first user device may be detected, such as by using periodic polling. Additional information may be used to further verify that a user device is on the transit vehicle. Oftentimes the additional information is used during transit between two locations. For example, location information of the first user device and/or the transit vehicle may be used. Location information from a GPS and/or other location sensor of the first user device may be provided to the transit vehicle, which may compared the received location information with a location of the transit vehicle to determine if the locations match within a distance that suggests the user device is on the transit vehicle. The vehicle location information may be provided by a GPS and/or other location sensor of the transit vehicle. Similarly, movement information from the user device and transit vehicle may be compared. For example, accelerometers and/or other sensors from the user device and transit vehicle may produce movement information that can be compared. If the movement data matches closely, it can be determined that it is likely the user device is on the transit vehicle. The location and/or movement information of the user device may also be compared to a known route of the transit vehicle to determine a likeliness that the user device is on the transit vehicle. In some embodiments, the transit vehicle may include multiple beacons or other signal transceivers that may communicate with the user device. Based on a signal strength from responses by the user device to each beacon, the transit computer may triangulate the user device position and determine whether the user device is on the transit vehicle. Further, a user may send a confirmation, using the user device, that the user device is on the transit vehicle. One or more of these forms of additional information may be used to verify the presence of the user device on the transit vehicle.

At block 1225, information regarding a fare payment indicator may be sent to the user device. This may occur after detecting the first user device is on the transit vehicle. The information may cause a fare payment indicator to be presented on a display of the first user device. This may be displayed prior to determining that the user device has exited the transit vehicle at 1265.

Additional information may be provided to a user device during a transit ride. For example, transit route information may be provided at block 1230. Transit route information may include, for example, an estimated time to each subsequent transit stop, a list of transit stops, information related to transit system transfers, and the like. In some embodiments, targeted advertisements may be provided to the user device at block 1235. For example, based on the location of the user device and/or transit vehicle, an advertisement may be provided for a business or other entity located near the next upcoming transit stop. The advertisement may include a coupon or other discount good.

At block 1240, a second indication may be received from a second user device that has checked into the transit vehicle while the transit vehicle is in transit from the first location to the second location. At block 1245, the transit vehicle computer may cause a late arriving indication to be displayed on the user device. The late arriving indication may be indicative of the second indication being first received when the transit vehicle is between the first location and the second location. A list of fare payment indicators and/or late arriving indications may also be communicated to a fare inspector device at block 1250. The list may also include identifying information associated with users of the user devices such that a fare inspector may easily identify which users have properly checked in and which may be committing fraud by checking in late. In some embodiments, ride information may be communicated to a transit server. This allows the transit system to maintain records of transit transactions. For example, ride information may include a route, a date of a ride, a time of a ride, a list of users who checked in properly, a list of users who checked in improperly, a list of users who received late arriving indications, and/or other information.

The presence of user devices that have not been checked in may be detected at block 1260. The wireless detection zone may be able to detect the presence of user devices on the transit vehicle and compare these users with those who have checked in. Upon a determination that the user device is not checked in, a prompt to check in may be sent to the user device. Additionally, or alternatively, a fare inspector device may be provided with an indication that a user device has not been checked in. Such an indication may also be provided to the transit server, such that the user may be billed, fined, and/or a note may be made in the user's transit account.

At block 1265, a determination may be made that the user device has exited the transit vehicle, and the transit vehicle may cause a fare to be calculated at block 1270. In embodiments where the transit vehicle computer calculates the fare, fare charge information may be provided to the user device. For example, a receipt for the transit ride may be sent to the user device that confirms the cost of the transit ride, provides a remaining balance on a transit account, and/or requests authorization for payment and/or entry of payment details.

Figure 13A:
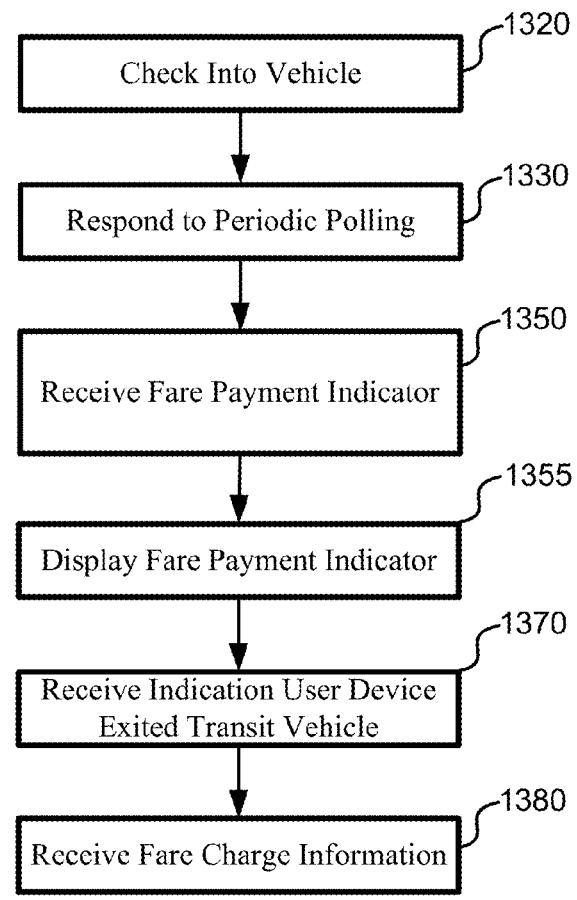
FIG. 13A is diagram illustrating the functionality of a transit application executed by a mobile device, according to one embodiment.

FIG. 13A is diagram illustrating the functionality of a mobile device 250 or 1125, according to one embodiment. As discussed above, a transit application may be provided by the transit system 100 or another source, and downloaded to a mobile device 250 or 1125 via the Internet. The transit application can provide additional information and functionality to a transit user using the mobile device 250 or 1125 executing the transit application.

This embodiment illustrates basic functionality of the transit application. At block 1320, for instance, the application can check the user device into a transit vehicle. This may be done by in several ways, such as those described in relation to FIG. 11. For example, a user may select a transit vehicle from a list of available transit vehicles on the application. In some embodiments, the list may be populated with transit vehicles based on the location of the user device. In other embodiments, the application may cause the mobile device to communicate with a beacon or other device positioned near a transit stop to determine the location of the mobile device. In other embodiments, the mobile application may detect a beacon or other device that is coupled with the transit vehicle. In other embodiments, the transit vehicle may have a separate beacon or signal device that provides an identifier of the transit vehicle to the mobile device. Upon identification of the transit vehicle, the application may prompt a user to check into the identified transit vehicle, rather than selecting the transit vehicle from a list.

To check in, a user may actively select a transit vehicle from a display of the mobile device. This may be done by selecting the transit vehicle from a list or by selecting a nearby transit vehicle as described above. In other embodiments, upon the user opening the application, the application may automatically check the mobile device into a nearby transit vehicle and/or a transit vehicle having a wireless detection zone within which the mobile device is detected.

At block 1330, the user device may respond to periodic polling by a wireless interface of the transit vehicle. The periodic polling responses may be used to confirm the presence of the user device on the transit vehicle. At block 1350, a fare payment indicator may be received. The fare payment indicator may be received prior to the user device exiting the transit vehicle, and may be displayed on the user device at block 1355. The fare payment indicator may be shown to the fare inspector as confirmation that the user has properly checked into the transit vehicle. In some embodiments, the fare payment indicator may be an icon, image, and/or pattern of lights, dots, and/or other visual indications. An indication may be received that the user device is no longer on the transit vehicle. For example, upon the vehicle determining that the user device is no longer responding to periodic polling, the vehicle computer may cause an indication to be sent to the user device and/or the transit server. The indication may be in the form of an SMS message, an email, a push notification of the mobile application, and/or other electronic communication. The user device may then receive fare charge information at block 1380. For example, a receipt for the transit ride may be sent to the user device that confirms the cost of the transit ride, provides a remaining balance on a transit account, and/or requests authorization for payment and/or entry of payment details.

Figure 13B:
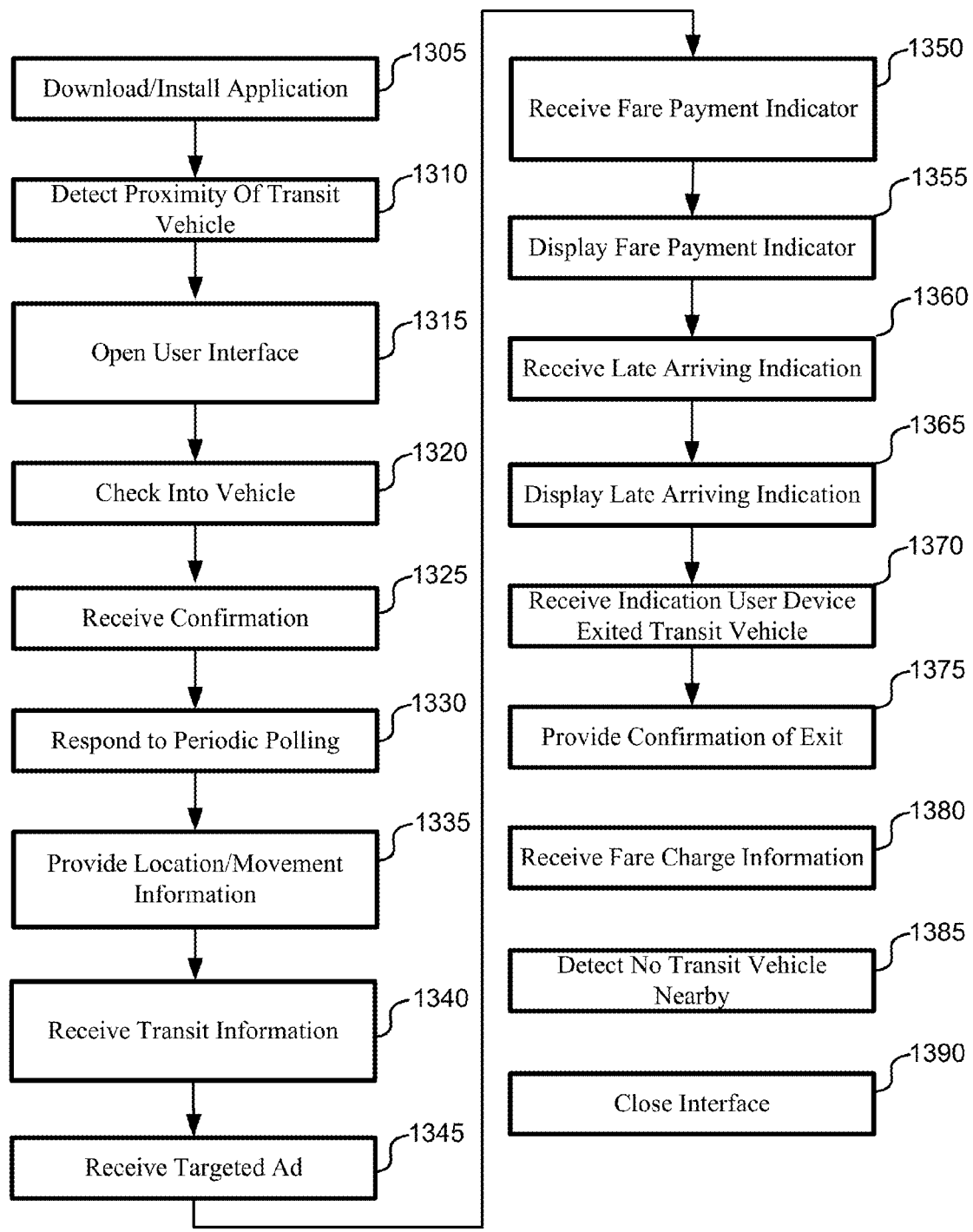
FIG. 13B is diagram illustrating the functionality of a transit application executed by a mobile device, according to an alternative embodiment.

FIG. 13B is diagram illustrating the functionality of a mobile device, according to an alternative embodiment. This embodiment illustrates additional functionality that a mobile device can provide, relating to a transit user's ride on a transit vehicle.

At block 1305, for instance, the user device download and install a mobile transit application. When run, the application can detect the proximity of a transit vehicle. Additionally or alternatively, it may detect the proximity of a transit station, a designated transit stop, or other "active transit area," as determined by the transit services provider, and/or the transit user. Proximity may be determined based on location data, such as GPS data. It may also be determined by one or more proximity sensors, such real-time locating systems (RTLS) as discussed above. Having determined the proximity of an active transit area, the transit application can, at block 1315, open a user interface, displaying, for example, information provided by a nearby transit system, such as a transit vehicle computer and/or a station server.

As with the embodiment of FIG. 13A, at block 1320, the user device may check into a transit vehicle. Additionally, however, as discussed in other embodiments herein, the transit application can receive transit user input to assist in determining whether the transit user is on the transit vehicle. For example, the user device may receive a prompt to confirm its presence on the transit vehicle and/or provide a confirmation to the transit vehicle computer at block 1325. The user device may respond to periodic polling at block 1330. To further verify that the user device is on the transit vehicle, the transit vehicle computer may request additional information from the user device. For example, location and/or movement information from the user device may be provided to the transit computer at block 1335. This information may be used by the transit vehicle computer to verify the presence of the user device as described above.

In some embodiments, additional information may be provided to a user device during a transit ride. For example, transit route information may be received at block 1340. Transit route information may include, for example, an estimated time to each subsequent transit stop, a list of transit stops, information related to transit system transfers, and the like. In some embodiments, targeted advertisements may be received by the user device at block 1345. For example, based on the location of the user device and/or transit vehicle, an advertisement may be provided for a business or other entity located near the next upcoming transit stop. The advertisement may include a coupon or other discount good.

A fare payment indicator may be received at block 1350 and displayed on the user device at block 1355. In embodiments, where the user device checks into the transit vehicle during transit, such as between a first transit stop and a second transit stop, a late arriving indication may be received at block 1360 and displayed on the user device at block 1365.

An indication that the user device has exited the transit vehicle may be received at block 1370. A user may be prompted to confirm its exit from the transit vehicle. A confirmation of the exit may be provided to the transit vehicle computer and/or transit server at block 1375. The user device may then receive fare charge information at block 1380.

In some embodiments, the user may actively close the user interface of the mobile application. This may be done at any time in the process. If the user has not closed the user interface and the mobile application does not detect any transit vehicles nearby at block 1385, the user device may close the interface at block 1390.

Other systems and methods for automated fare calculation are described in U.S. application Ser. No. 13/524,248, filed Jun. 15, 2012, which is a division of U.S. application Ser. No. 12/952,706, filed Nov. 23, 2010 by Dixon et al., entitled "Mobile Wireless Payment and Access" which is related to and claims the benefit of U.S. Provisional Patent Application No. 61/264,618 filed Nov. 25, 2009 by deKozan et al. and entitled "Mobile Wireless Payment and Access" and U.S. Provisional Patent Application No. 61/354,148 filed Jun. 11, 2010 by Dixon et al. and entitled "Be-In/Be-Out," the entire disclosures of which are herein incorporated by reference for all purposes.

It will be understood that embodiments disclosed in above may include more or less features, depending on desired functionality. In various embodiments, a sequence of steps of each method may be performed in different orders. The processes and systems described herein may be combined in part and/or in whole with one another in some embodiments. Additionally, embodiments may include additional steps and/or subprocesses, omit steps and/or subprocces, combine one or more steps and/or subprocesses, and/or split a step and/or subprocess into multiple steps and/or subprocesses. Moreover, some or all of the features may be achieved without the use of a transit application installed on a mobile devices 250 and/or 1125. For instance, communication to and/or from the mobile device may be achieved through one or more of SMS messaging, automated phone calls, emails, etc.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

What is claimed is:

1. A method for enabling automatic fare payment in a transit system, the method comprising:
   providing a mobile transit vehicle computer on a moving transit vehicle, the mobile transit computer having a wireless detection zone comprising a wireless interface, wherein the wireless detection zone extends to at least a physical boundary of the transit vehicle;
   determining that a first user device is near the transit vehicle;
   prompting the mobile device for confirmation that the first user device has boarded or will board the transit vehicle;
   receiving, using the wireless interface, a confirmation from the first user device, the confirmation indicting that the first user device has boarded or will board the transit vehicle, the confirmation being received at a first location;
   detecting, using the wireless interface, that the first user device is on the transit vehicle by periodically polling the first user device during transit from the first location to a second location;
   receiving, using the wireless interface, a second unique identifier associated with a second user device while the transit vehicle is in transit between the first location and the second location, wherein the second user device is first detected by the wireless interface while on the transit vehicle between the first location and the second location based on at least some of the functionality of the second user device being activated between the first location and the second location;
   sending to one or both of the second user device or a fare inspector device, using the wireless interface, a late arriving indication that the second user device is on the transit vehicle, wherein:
      the late arriving indication causes the late arriving indication to display on the one or both of the second user device or the fare inspector device; and
      the late arriving indication is indicative of the second unique identifier being first received while the transit vehicle is between the first location and the second location;
   determining, using the wireless interface, the first user device has exited the transit vehicle while the transit vehicle is at or near the second location based at least in part on when the first user device is no longer detected within the wireless detection zone during the periodic polling; and
   causing a fare to be calculated for the user of the first user device based on the first location and the second location.

2. The method for enabling automatic fare payment in a transit system of claim 1, further comprising:
   sending, using the wireless interface, information regarding a fare payment indicator to the user device upon detecting the first user device is on the transit vehicle, wherein:
      the information causes the first user device to show, on a display of the first user device, the fare payment indicator, and
      the fare payment indicator is displayed on the first user device before the wireless interface is used to determine the first user device has exited the transit vehicle.

3. The method for enabling automatic fare payment in a transit system of claim 1, wherein:
   detecting that the first user device is on the vehicle, determining that the first user device has exited the transit vehicle, or both, further includes using at least one type of information of a group consisting of:
      location information associated with the first user device, the transit vehicle, or both;
      movement information associated with the first user device, the transit vehicle, or both;
      information regarding the route of the transit vehicle;
      information received from one or more additional wireless devices in the transit vehicle; and
      input received by the first user device from a transit user.

4. The method for enabling automatic fare payment in a transit system of claim 1, wherein:
   causing a fare to be calculated comprises communicating a message to a central server such that the fare is calculated by the central server, the message comprising the identifier of the first user device, the first location, and the second location.

5. The method for enabling automatic fare payment in a transit system of claim 1, further comprising:

providing the first user device with transit route information while the first user device is detected on the transit vehicle.

6. The method for enabling automatic fare payment in a transit system of claim 1, wherein:
causing a fare to be calculated comprises the transit vehicle computer using the identifier of the first user device, the first location, and the second location to calculate a fare for the user of the first user device.

7. A system for enabling automatic fare payment in transit, the system comprising:
a wireless detection zone comprising a wireless interface, wherein the wireless detection zone extends to at least a physical boundary of a transit vehicle;
a processor communicatively coupled with the wireless interface and a memory; and
the memory having instructions embodied therein which, when executed by the processor, cause the system to:
determine that a first user device is near the transit vehicle;
prompt the mobile device for confirmation that the first user device has boarded or will board the transit vehicle;
receive, using the wireless interface, a confirmation from the first user device, the confirmation indicting that the first user device has boarded or will board the transit vehicle, the confirmation being received at a first location;
detect, using the wireless interface, that the first user device is on the transit vehicle by periodically polling the first user device during transit from the first location to a second location;
receive, using the wireless interface, a second unique identifier associated with a second user device while the transit vehicle is in transit between the first location and the second location, wherein the second user device is first detected by the wireless interface while on the transit vehicle between the first location and the second location based on at least some of the functionality of the second user device being activated between the first location and the second location;
send to one or both of the second user device or a fare inspector device, using the wireless interface, a late arriving indication that the second user device is on the transit vehicle, wherein:
the late arriving indication causes the late arriving indication to display on the one or both of the second user device or the fare inspector device; and
the late arriving indication is indicative of the second unique identifier being first received while the transit vehicle is between the first location and the second location;
determine, using the wireless interface, the first user device has exited the transit vehicle while the transit vehicle is at or near the second location based at least in part on when the first user device is no longer detected within the wireless detection zone during the periodic polling; and
cause a fare to be calculated for the user of the first user device based on the first location and the second location.

8. The system for enabling automatic fare payment in transit of claim 7, wherein the memory further includes instructions embodied therein which, when executed by the processor, cause the system to:
send, using the wireless interface, information regarding a fare payment indicator to the first user device upon detecting the first user device is on the transit vehicle, wherein:
the information causes the first user device to show, on a display of the first user device, the fare payment indicator, and
the fare payment indicator is displayed on the first user device before the wireless interface is used to determine the first user device has exited the transit vehicle.

9. The system for enabling automatic fare payment in transit of claim 7, wherein:
detecting that the first user device is on the vehicle, determining that the first user device has exited the transit vehicle, or both, further includes using at least one type of information of a group consisting of:
location information associated with the first user device, the transit vehicle, or both;
movement information associated with the first user device, the transit vehicle, or both;
information regarding the route of the transit vehicle;
information received from one or more additional wireless devices in the transit vehicle; and
input received by the first user device from a transit user.

10. The system for enabling automatic fare payment in transit of claim 7, wherein:
causing a fare to be calculated comprises communicating a message to a central server such that the fare is calculated by the central server, the message comprising the identifier of the first user device, the first location, and the second location.

11. The system for enabling automatic fare payment in transit of claim 7, wherein the memory further includes instructions embodied therein which, when executed by the processor, cause the system to:
provide the first user device with transit route information while the first user device is detected on the transit vehicle.

12. The system for enabling automatic fare payment in transit of claim 7, wherein:
causing a fare to be calculated comprises the transit vehicle computer using the identifier of the first user device, the first location, and the second location to calculate a fare for the user of the first user device.

13. A non-transitory computer-readable medium having instructions embedded thereon for enabling automatic fare payment in transit, the instructions comprising computer code for causing a computing device to:
determine that a first user device is near the transit vehicle;
prompt, using a wireless interface, the mobile device for confirmation that the first user device has boarded or will board the transit vehicle;
receive, using the wireless interface a wireless detection zone that extends to at least a physical boundary of a transit vehicle, a confirmation from the first user device, the confirmation indicting that the first user device has boarded or will board the transit vehicle, the confirmation being received at a first location;
detect, using the wireless interface, that the first user device is on the transit vehicle by periodically polling the first user device during transit from the first location to a second location;
receive, using the wireless interface, a second unique identifier associated with a second user device while the transit vehicle is in transit between the first location and the second location, wherein the second user device is first detected by the wireless interface while on the transit vehicle between the first location and the second location based on at least some of the functionality of the second user device being activated between the first location and the second location;

send to one or both of the second user device or a fare inspector device, using the wireless interface, a late arriving indication that the second user device is on the transit vehicle, wherein:
the late arriving indication causes the late arriving indication to display on the one or both of the second user device or the fare inspector device; and
the late arriving indication is indicative of the second unique identifier being first received while the transit vehicle is between the first location and the second location;

determine, using the wireless interface, the first user device has exited the transit vehicle while the transit vehicle is at or near the second location based at least in part on when the first user device is no longer detected within the wireless detection zone during the periodic polling; and cause a fare to be calculated for the user of the first user device based on the first location and the second location.

14. The non-transitory computer-readable medium of claim 13, further comprising instructions for causing the computing device to:

send, using the wireless interface, information regarding a fare payment indicator to the first user device upon detecting the first user device is on the transit vehicle, wherein:

the information causes the first user device to show, on a display of the first user device, the fare payment indicator, and the fare payment indicator is displayed on the first user device before the wireless interface is used to determine the first user device has exited the transit vehicle.

15. The non-transitory computer-readable medium of claim 13, wherein:

detecting that the first user device is on the vehicle, determining that the first user device has exited the transit vehicle, or both, further includes using at least one type of information of a group consisting of:

location information associated with the first user device, the transit vehicle, or both;

movement information associated with the first user device, the transit vehicle, or both;

information regarding the route of the transit vehicle;

information received from one or more additional wireless devices in the transit vehicle; and input received by the first user device from a transit user.

16. The non-transitory computer-readable medium of claim 13, wherein:

causing a fare to be calculated comprises communicating a message to a central server such that the fare is calculated by the central server, the message comprising the identifier of the first user device, the first location, and the second location.

17. The non-transitory computer-readable medium of claim 13, further comprising instructions for causing the computing device to:

provide the first user device with transit route information while the first user device is detected on the transit vehicle.

18. The non-transitory computer-readable medium of claim 13, wherein:

causing a fare to be calculated comprises the transit vehicle computer using the identifier of the first user device, the first location, and the second location to calculate a fare for the user of the first user device.

* * * * *